(12) United States Patent
da Silva et al.

(10) Patent No.: US 12,256,453 B2
(45) Date of Patent: Mar. 18, 2025

(54) CONDITIONAL HANDOVER IN HANDOVER COMMAND

(71) Applicant: Telefonaktiebolaget LM Ericsson (publ), Stockholm (SE)

(72) Inventors: Icaro Leonardo da Silva, Solna (SE); Cecilia Eklöf, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 311 days.

(21) Appl. No.: 17/632,617

(22) PCT Filed: Aug. 14, 2020

(86) PCT No.: PCT/SE2020/050785
§ 371 (c)(1),
(2) Date: Feb. 3, 2022

(87) PCT Pub. No.: WO2021/029819
PCT Pub. Date: Feb. 18, 2021

(65) Prior Publication Data
US 2022/0322174 A1    Oct. 6, 2022

Related U.S. Application Data

(60) Provisional application No. 62/887,431, filed on Aug. 15, 2019.

(51) Int. Cl.
*H04W 76/19*       (2018.01)
*H04W 36/00*       (2009.01)
*H04W 36/08*       (2009.01)

(52) U.S. Cl.
CPC ....... *H04W 76/19* (2018.02); *H04W 36/0055* (2013.01); *H04W 36/00837* (2018.08);
(Continued)

(58) Field of Classification Search
CPC ................. H04W 36/08; H04W 36/00837; H04W 76/19
(Continued)

(56) References Cited

U.S. PATENT DOCUMENTS

| 2013/0225168 A1* | 8/2013 | Singh .............. H04W 36/00835 |
| | | 455/435.1 |
| 2016/0021581 A1 | 1/2016 | Deenoo et al. |
| 2019/0223073 A1 | 7/2019 | Chen et al. |

FOREIGN PATENT DOCUMENTS

| CN | 108738092 A | 11/2018 |
| WO | 2016114623 A1 | 7/2016 |

(Continued)

OTHER PUBLICATIONS

International Search Report and Written Opinion dated Sep. 23, 2020 for International Application No. PCT/SE2020/050785 filed Aug. 14, 2020, consisting of 19 pages.
(Continued)

*Primary Examiner* — Joel Ajayi
(74) *Attorney, Agent, or Firm* — Weisberg I.P. Law. P.A.

(57) ABSTRACT

Methods and apparatuses are disclosed for conditional handover in handover command. In one embodiment, a wireless device (WD) is configured to receive a request to perform a mobility procedure for a wireless device from a source cell supported by a source network node to a target cell supported by the network node, the request including a current configuration for the wireless device in the source cell; upon receiving the request, determine to prepare a conditional reconfiguration for the wireless device; and transmit the conditional reconfiguration and a radio resource control, RRC, reconfiguration for the wireless device, the RRC reconfiguration being associated with the requested mobility procedure from the source cell to the target cell supported by the network node and the conditional reconfiguration being associated with a target candidate cell determined by the network node.

16 Claims, 11 Drawing Sheets

(52) U.S. Cl.
CPC .. *H04W 36/0064* (2023.05); *H04W 36/00698* (2023.05); *H04W 36/08* (2013.01)

(58) Field of Classification Search
USPC ........................................................ 455/437
See application file for complete search history.

(56) References Cited

FOREIGN PATENT DOCUMENTS

| | | |
|---|---|---|
| WO | 2018175719 A1 | 9/2018 |
| WO | 2019096396 A1 | 5/2019 |

OTHER PUBLICATIONS

3GPP TSG-RAN WG2 Meeting #103bis R2-1814192; Title: Signalling procedure on DC handover in EUTRAN; Source; vivo; Agenda Item: 12.3.3; Document for: Discussion and Decision; Date and Location: Oct. 8-12, 2018, Chengdu, China; consisting of 4 pages.

3GPP TSG-RAN WG2 Meeting #106 R2-1906489; Title: Discussions on LTE Conditional Handover Procedures; Agenda Item: 12.3.3.1; Source: MediaTek Inc.; Document for: Discussion and decision; Date and Location: May 13-17, 2019, Reno, NV, USA; consisting of 6 pages.

Indian Examination Report date Jul. 15, 2022 for Application No. 202247013038, consisting of 6 pages.

Chinese Office Action and English Summary dated Jan. 4, 2025 for Application No. 202080071620.8, consisting of 11 pages.

* cited by examiner

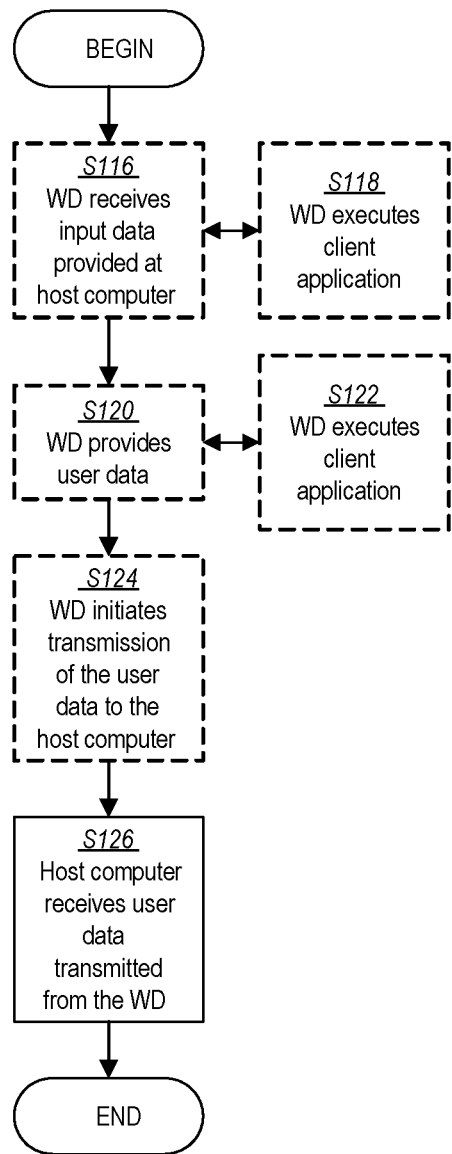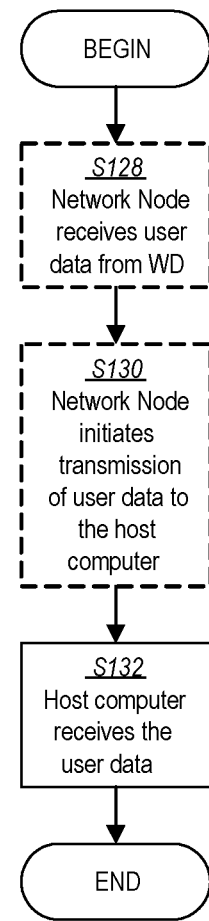
FIG. 8
FIG. 9

CONDITIONAL HANDOVER IN HANDOVER COMMAND

CROSS-REFERENCE TO RELATED APPLICATIONS

This application is a Submission Under 35 U.S.C. § 371 for U.S. National Stage Patent Application of International Application No.: PCT/SE2020/050785, filed Aug. 14, 2020 entitled "CONDITIONAL HANDOVER IN HANDOVER COMMAND," which claims priority to U.S. Provisional Application No. 62/887,431, filed Aug. 15, 2019, entitled "CONDITIONAL HANDOVER IN HANDOVER COMMAND," the entireties of both of which are incorporated herein by reference.

TECHNICAL FIELD

The present disclosure relates to wireless communication and in particular, to conditional handover.

BACKGROUND

Mobility in RRC_CONNECTED in LTE and NR

An RRC_CONNECTED wireless device (WD), such as a user equipment (UE) in $3^{rd}$ Generation Partnership Project (3GPP) Long Term Evolution (LTE) (also called Evolved Universal Terrestrial Radio Access (EUTRA)) can be configured by a network node to perform measurements and, upon triggering measurement reports the network node may send a handover (HO) command to the WD (in LTE an RRConnectionReconfiguration with a field called mobilityControlInfo and in 3GPP New Radio (NR) (also known as "5G") an RRCReconfiguration with a reconfigurationWithSync field).

These reconfigurations are actually prepared by the target cell (or more specifically a network node supporting the target cell) upon a request from the source node (over X2 interface in case of EUTRA-EPC or Xn interface in case of EUTRA-$5^{th}$ Generation (5GC) or NR) and takes into account the existing/current radio resource control (RRC) configuration the WD has with the source cell (which are provided in the inter-node request). Among other parameters that reconfiguration provided by the target network node contains all information the WD uses to access the target cell, e.g., random access configuration, a new C-RNTI (cell radio network temporary identifier) assigned by the target cell and security parameters enabling the WD to calculate new security keys associated to the target cell so the WD can send a handover complete message on signaling radio bearer 1 (SRB1 (encrypted and integrity protected) based on new security keys upon accessing the target cell.

FIG. 1 is an example diagram that summarizes an example of the flow signaling between WD, source network node (NN) and target network node (NN) during a handover procedure. For example, the flow signaling may include the following:

1. WD sends a measurement report;
2. Source NN makes a handover (HO) decision;
3. Source NN sends a HO request to target NN;
4. Target NN performs admission control;
5. Target NN sends a HO request acknowledgement;
6. A Uu handover trigger is performed between the WD and source NN;
7. Source NN sends a sequence number (SN) status transfer to target NN;
8. WD detaches from the old cell and synchronizes to the new cell;
9. Source NN delivers buffered and in transmit user to target NN;
10. Source NN forwards user data to target NN;
11. Target NN buffers user data from the source NN; and
12. WD synchronizes to the new cell and completes the RRC handover procedure.

Both in LTE and NR, some principles exist for handovers (or in more general terms, mobility in RRC_CONNECTED). Examples of these principles include that:

a) Mobility in RRC_CONNECTED is Network-based as the network node has best information regarding the current situation such as load conditions, resources in different nodes, available frequencies, etc. Network can also take into account the situation of many WDs in the network, for a resource allocation perspective.

b) Network prepares a target cell before the WD accesses that cell. Source network node (NN) provides WD with the RRC configuration to be used in the target cell, including signalling radio bearer 1 (SRB1) configuration to send HO complete message.

c) The WD is provided by target NN with a target C-RNTI i.e., target identifies WD from message 3 (MSG.3) on medium access control (MAC level) for the HO complete message. Hence, there is no context fetching, unless a failure occurs.

d) To speed up the handover, network node provides information on how to access the target e.g., random access channel (RACH) configuration, so the WD does not have to acquire system information (SI) prior to the handover.

e) The WD may be provided with contention-free random access (CFRA) resources, i.e., in that case target NN identifies the WD from the preamble (MSG.1). The principle behind this is that the procedure can always be optimized with dedicated resources. In conditional HO (CHO) that might be a bit tricky as there is uncertainty about the final target cell/NN and also the timing.

f) Security is prepared before the WD accesses the target cell e.g., keys are to be refreshed before sending the RRC Connection Reconfiguration Complete message, based on new keys and encrypted and integrity-protected so the WD can be verified in the target cell.

g) Both full and delta reconfiguration are supported so that the HO command can be minimized.

Mobility Robustness Work Item in Rel-16 for LTE and NR and Conditional HO

Two new work items for mobility enhancements in LTE and NR have started in $3^{rd}$ Generation Partnership Project (3GPP) in Release 16 (Rel-16). One objective of the work items is to improve the robustness at handover, i.e., quality of the handover, and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the WD are already quite bad. That may lead to the HO Command not reaching the WD in time if the message is segmented or there are retransmissions.

In LTE and NR, different solutions to increase mobility robustness have been discussed in the past. One solution discussed in NR is called "conditional handover" or "early handover command". In order to avoid the undesired dependence on the serving radio link upon the time (and radio conditions) where the WD may perform/execute the handover, the possibility to provide RRC signaling for the handover to the WD earlier may be provided. To achieve this, it may be possible to associate the HO command with a condition e.g., based on radio conditions possibly similar to the ones associated to an A3 event, where a given neighbor becomes X decibel (dB) better than the target cell. As soon as the condition is fulfilled, the WD can execute the handover in accordance with the provided handover command.

Such a condition could e.g., be that the quality of the target cell or beam becomes X dB stronger than the serving/source cell. The threshold Y used in a preceding measurement reporting event may then be chosen lower than the X threshold in the handover execution condition. This allows the NN supporting the serving/source cell to prepare the handover upon reception of an early measurement report and to provide the RRCConnectionReconfiguration with mobilityControlInfo at a time when the radio link between the source cell and the WD is still stable. The execution of the handover is performed at a later point in time (and threshold) which is considered optimal for the handover execution.

FIG. 2 depicts an example signaling flow for conditional handover of a WD involving just a source NN supporting a serving/source cell and a target NN supporting a target cell. For example, the flow signaling may include the following:
1. WD sends a measurement report having a low threshold, Y, as compared to the X threshold;
2. Source NN makes a HO decision based on the early measurement report;
3. Source NN sends an early HO request to target NN;
4. Target NN accepts the HO request and builds an RRC configuration for the WD;
5. Target NN sends a HO acknowledgement including the RRC configuration to source NN;
6. Source NN sends a conditional HO command having the high threshold X to the WD;
7. When measurements fulfill the HO condition, WD triggers the pending conditional HO;
8. WD synchronizes and performs the random access to the target cell;
9. WD sends a HO confirmation to target NN;
10. Target NN sends a HO completed message to source NN; and
11. Target NN is able to send user plane (UP) data to the WD in the target cell.

In practice there may often be many cells or beams that the WD reported as possible candidate cells based on its preceding radio resource management (RRM) measurements. The network node may then have the freedom to issue conditional handover commands for several of those candidates. The RRCConnectionReconfiguration for each of those candidates may differ e.g., in terms of the HO execution condition (reference signal (RS) to measure and threshold to exceed) as well as in terms of the random access (RA) preamble to be sent when a condition is met.

While the WD evaluates the condition associated with the conditional HO command, the WD may continue operating per its current RRC configuration in the source cell, i.e., without applying the conditional HO command. When the WD determines that the condition is fulfilled, the WD disconnects from the serving/source cell, applies the conditional HO command and connects to the target cell. At least some of these conditional HO steps (e.g., of disconnecting from the serving cell, applying the HO and connecting to the target cell) may be considered equivalent or similar to the current, instantaneous handover execution.

The following has been considered for conditional handover:

Considerations:
  The source cell (such as for example the source network node) decides on the condition for the execution/performance of CHO.
  The source cell (such as for example the source network node) adds the condition for the execution of CHO to the RRC message sent to WD.
  Multiple CHO candidate cells can be sent in either one or multiple RRC messages. For further study (FFS) on signalling details. FFS how CHO execution is handled.
  CHO execution does not trigger measurement report.
  On cell level A3/A5-like CHO execution condition may be specified (other events will not be specified without clear justifications).

Other Considerations:
  Separate CHO execution condition(s) can be configured for each individual candidate cells.
  Define a CHO execution condition by the measurement identity which identifies a measurement configuration. (FFS to be addressed in stage 3 which parts of the measurement configuration are used for the CHO triggering).
  As a baseline CHO can be triggered based on a condition consisting of a single event, single RS type, singe quantity.
    The single trigger quantity can be configured to be RSRP, RSRQ or RS-SINR
    The single RS type can be configured to be SSB or CSI-RS
  FFS Whether multiple triggering conditions are required.

Still other Considerations:
  Deconfiguration of CHO candidates is performed by RRC signalling (we will not introduce timer based mechanism for the WD to deconfiguration of the CHO candidates)
  Baseline that configuration of all CHO candidates is released after successful (any) handover completion (sending complete message to the target cell).
  FFS if it might be possible to keep CHO candidates after the HO.

Further Considerations:
  The WD may not stop T310 and may not start T304 when it receives configuration of a CHO candidate
  The timer T310 is stopped and timer T304-like is started when the WD begins execution of a conditional handover for a target cell. (Stage 3 detail whether we reuse T304 or define a new timer)
  Working assumptions based on further Considerations above:
    At RLF the WD performs cell selection and if the selected cell is a CHO candidate then the WD attempts CHO execution, otherwise re-establishment is performed
    At legacy handover failure (T304 expiry) or failure to access a CHO candidate cell (T304-like expiry), the WD performs cell selection and if the selected cell is a CHO candidate then the WD attempts CHO execution, otherwise re-establishment is performed.

It was considered that as part of CHO configuration to be sent to the WD, an RRC container may be used to carry the target cell configuration and the source cell is not allowed to alter any content of the configuration from the target cell. In addition to it, it was considered to enhance the existing RRCReconfiguration message to include conditional handover configuration.

SUMMARY

Some embodiments advantageously provide methods, systems, and apparatuses for conditional handover in handover command.

In one embodiment, a method implemented in a network node includes one or more of: receiving a handover (HO) preparation message from a source network node in an HO procedure, the HO preparation message including a current configuration of the WD in a source cell; determining to configure a conditional handover (CHO) for the WD; and/or transmitting a message to the source network node, the message including the determined CHO configuration.

In one embodiment, a method implemented in a wireless device (WD) includes one or more of: receiving message, the message being a radio resource control (RRC) reconfiguration message that includes a conditional handover (CHO) configuration and an indication of a handover (HO) command, the CHO prepared by a target network node and the HO command prepared by a source network node; responsive to the received message, attempting to access the target network node indicated in the HO command; and/or after accessing the target network node, performing the CHO according to the CHO configuration in the received message.

According to an aspect of the present disclosure, a method implemented a wireless device, WD, configured to communicate with a network node is provided. The method includes receiving at least one radio resource control, RRC, reconfiguration message, the at least one RRC reconfiguration message including a conditional reconfiguration and an indication that the wireless device is to perform a mobility procedure. The indication to perform the mobility procedure indicates to perform the mobility procedure from a source cell supported by the network node to a target cell supported by a target network node. The conditional reconfiguration is associated with a target candidate cell corresponding to the target network node.

In some embodiments of this aspect, the method includes upon receiving the at least one RRC reconfiguration message, performing the mobility procedure indicated in the received at least one RRC reconfiguration by attempting to access the target cell. In some embodiments of this aspect, the method includes as a result of accessing the target cell, performing at least one action according to the conditional reconfiguration comprised in the received at least one RRC reconfiguration. In some embodiments of this aspect, the method includes as a result of a failure in the attempt to access the target cell, selecting a candidate cell associated with a conditional handover and performing a handover of the wireless device to the selected candidate cell. In some embodiments of this aspect, selecting the candidate cell associated with the conditional handover comprises: as the result of the failure in the attempt to access the target cell, selecting the candidate cell from among at least a plurality of candidate cells, each candidate cell being associated with a respective conditional handover and the target network node.

In some embodiments of this aspect, selecting the candidate cell associated with the conditional handover comprises as the result of the failure in the attempt to access the target cell, selecting the candidate cell from among at least a plurality of candidate cells, each candidate cell being associated with a respective conditional handover and the network node supporting the source cell. In some embodiments of this aspect, an explicit indication indicates to the wireless device to select the candidate cell from among at least one of a first plurality of candidate cells associated with the network node supporting the source cell and a second plurality of candidate cells associated with the target network node as the result of the failure in the attempt to access the target cell.

In some embodiments of this aspect, the conditional reconfiguration and the indication to perform the mobility procedure are both included in a same RRC reconfiguration message. In some embodiments of this aspect, an explicit indication indicates to the wireless device to perform the conditional reconfiguration comprised in the same RRC reconfiguration message only after accessing the target cell according to the mobility procedure indicated in the same RRC reconfiguration message. In some embodiments of this aspect, the conditional reconfiguration and the indication to perform the mobility procedure are prohibited from being in a same RRC reconfiguration message. In some embodiments of this aspect, the method includes when the conditional reconfiguration and the indication to perform the mobility procedure are included in a same RRC reconfiguration message, performing an RRC re-establishment procedure, instead of the indicated mobility procedure and the conditional reconfiguration.

In some embodiments of this aspect, the mobility procedure is a handover of the wireless device from the source cell to the target cell. In some embodiments of this aspect, the mobility procedure corresponds to request to at least one of add and change a primary secondary cell, PScell, for the wireless device. In some embodiments of this aspect, the indication to perform the mobility procedure includes one of a reconfiguration with sync field and a mobility control information field comprised in the at least one RRC reconfiguration message. In some embodiments of this aspect, the method further includes receiving signaling indicating to one of add, modify and release the conditional reconfiguration of the target candidate cell prepared by the target network node.

In some embodiments of this aspect, the conditional reconfiguration associated with the target candidate cell includes a trigger condition configuration, the trigger condition configuration including a set of pointers to at least one measurement identifier, and each measurement identifier of the at least one measurement identifier is associated with at least one trigger condition and an RRC reconfiguration. In some embodiments of this aspect, the method further includes determining to not transmit a RRC reconfiguration complete message based at least in part on a presence of the conditional reconfiguration associated with the target candidate cell in the at least one RRC reconfiguration message.

In another aspect of the present disclosure, a method implemented in a network node is provided. The method includes receiving a request to perform a mobility procedure for a wireless device from a source cell supported by a source network node to a target cell supported by the network node, the request including a current configuration for the wireless device in the source cell. The method includes upon receiving the request, determining to prepare a conditional reconfiguration for the wireless device. The method includes transmitting the conditional reconfiguration and a radio resource control, RRC, reconfiguration for the wireless device, the RRC reconfiguration being associated with the requested mobility procedure from the source cell to the target cell supported by the network node and the conditional reconfiguration being associated with a target candidate cell determined by the network node.

In some embodiments of this aspect, the conditional reconfiguration is to be used by the wireless device after accessing the target cell indicated in the requested mobility procedure. In some embodiments of this aspect, the target candidate cell associated with the conditional reconfiguration is selectable by the wireless device for a handover of the wireless device to the target candidate cell upon a failure to access the target cell indicated in the requested mobility procedure. In some embodiments of this aspect, the target candidate cell associated with the conditional reconfiguration is not selectable by the wireless device for a handover of the wireless device to the target candidate cell upon a failure to access the target cell indicated in the requested mobility procedure.

In some embodiments of this aspect, the mobility procedure is a handover of the wireless device from the source cell to the target cell. In some embodiments of this aspect, the mobility procedure corresponds to request to at least one of add and change a primary secondary cell, PScell, for the wireless device. In some embodiments of this aspect, the determining to prepare the conditional reconfiguration for the wireless device is based at least in part on a measurement from the wireless device included in the received request to perform the mobility procedure. In some embodiments of this aspect, preparing the conditional reconfiguration for the wireless device comprises transmitting the RRC reconfiguration for the wireless device to a target candidate network node supporting the target candidate cell; and obtaining the conditional reconfiguration from the target candidate network node, the conditional reconfiguration being based at least in part on the transmitted RRC reconfiguration.

In some embodiments of this aspect, the at least one of the conditional reconfiguration associated with the target candidate cell and the RRC reconfiguration associated with the target cell of the mobility procedure is based at least in part on the received current configuration for the wireless device in the source cell. In some embodiments of this aspect, the method further includes receiving an RRC reconfiguration complete message; and as a result of the received RRC reconfiguration complete message, communicating with the wireless device based on an assumption that the wireless device is operating according to the conditional reconfiguration.

According to yet another aspect of the present disclosure, a wireless device, WD, configured to communicate with a network node is provided. The wireless device comprises processing circuitry. The processing circuitry is configured to cause the wireless device to receive at least one radio resource control, RRC, reconfiguration message, the at least one RRC reconfiguration message including a conditional reconfiguration and an indication that the wireless device is to perform a mobility procedure. The indication to perform the mobility procedure indicates to perform the mobility procedure from a source cell supported by the network node to a target cell supported by a target network node. The conditional reconfiguration is associated with a target candidate cell corresponding to the target network node.

In some embodiments of the aspect, the processing circuitry is further configured to cause the wireless device to upon receiving the at least one RRC reconfiguration message, perform the mobility procedure indicated in the received at least one RRC reconfiguration by attempting to access the target cell. In some embodiments of the aspect, the processing circuitry is further configured to cause the wireless device to as a result of accessing the target cell, perform at least one action according to the conditional reconfiguration comprised in the received at least one RRC reconfiguration. In some embodiments of the aspect, the processing circuitry is further configured to cause the wireless device to as a result of a failure in the attempt to access the target cell, select a candidate cell associated with a conditional handover and performing a handover of the wireless device to the selected candidate cell.

In some embodiments of the aspect, the processing circuitry is configured to cause the wireless device to select the candidate cell associated with the conditional handover by being configured to cause the wireless device to as the result of the failure in the attempt to access the target cell, select the candidate cell from among at least a plurality of candidate cells, each candidate cell being associated with a respective conditional handover and the target network node. In some embodiments of the aspect, the processing circuitry is configured to cause the wireless device to select the candidate cell associated with the conditional handover by being configured to cause the wireless device to as the result of the failure in the attempt to access the target cell, select the candidate cell from among at least a plurality of candidate cells, each candidate cell being associated with a respective conditional handover and the network node supporting the source cell.

In some embodiments of the aspect, an explicit indication indicates to the wireless device to select the candidate cell from among at least one of a first plurality of candidate cells associated with the network node supporting the source cell and a second plurality of candidate cells associated with the target network node as the result of the failure in the attempt to access the target cell. In some embodiments of the aspect, the conditional reconfiguration and the indication to perform the mobility procedure are both included in a same RRC reconfiguration message. In some embodiments of the aspect, an explicit indication indicates to the wireless device to perform the conditional reconfiguration comprised in the same RRC reconfiguration message only after accessing the target cell according to the mobility procedure indicated in the same RRC reconfiguration message.

In some embodiments of the aspect, the conditional reconfiguration and the indication to perform the mobility procedure are prohibited from being in a same RRC reconfiguration message. In some embodiments of the aspect, the processing circuitry is further configured to cause the wireless device to when the conditional reconfiguration and the indication to perform the mobility procedure are included in a same RRC reconfiguration message, perform an RRC re-establishment procedure, instead of the indicated mobility procedure and the conditional reconfiguration. In some embodiments of the aspect, the mobility procedure is a handover of the wireless device from the source cell to the target cell. In some embodiments of the aspect, the mobility procedure corresponds to request to at least one of add and change a primary secondary cell, PScell, for the wireless device.

In some embodiments of the aspect, the indication to perform the mobility procedure includes one of a reconfiguration with sync field and a mobility control information field comprised in the at least one RRC reconfiguration message. In some embodiments of the aspect, the processing circuitry is further configured to cause the wireless device to receive signaling indicating to one of add, modify and release the conditional reconfiguration of the target candidate cell prepared by the target network node. In some embodiments of the aspect, the conditional reconfiguration associated with the target candidate cell includes a trigger condition configuration, the trigger condition configuration including a set of pointers to at least one measurement identifier, and each measurement identifier of the at least one measurement identifier is associated with at least one trigger condition and an RRC reconfiguration.

In some embodiments of the aspect, the processing circuitry is further configured to cause the wireless device to determine to not transmit a RRC reconfiguration complete message based at least in part on a presence of the conditional reconfiguration associated with the target candidate cell in the at least one RRC reconfiguration message.

According to yet another of the present disclosure, a network node is provided. The network node comprising processing circuitry. The processing circuitry is configured to cause the network node to receive a request to perform a mobility procedure for a wireless device from a source cell supported by a source network node to a target cell supported by the network node, the request including a current configuration for the wireless device in the source cell. The processing circuitry is configured to cause the network node to upon receiving the request, determine to prepare a conditional reconfiguration for the wireless device. The processing circuitry is configured to cause the network node to transmit the conditional reconfiguration and a radio resource control, RRC, reconfiguration for the wireless device, the RRC reconfiguration being associated with the requested mobility procedure from the source cell to the target cell supported by the network node and the conditional reconfiguration being associated with a target candidate cell determined by the network node.

In some embodiments of the aspect, the conditional reconfiguration is to be used by the wireless device after accessing the target cell indicated in the requested mobility procedure. In some embodiments of the aspect, the target candidate cell associated with the conditional reconfiguration is selectable by the wireless device for a handover of the wireless device to the target candidate cell upon a failure to access the target cell indicated in the requested mobility procedure. In some embodiments of the aspect, the target candidate cell associated with the conditional reconfiguration is not selectable by the wireless device for a handover of the wireless device to the target candidate cell upon a failure to access the target cell indicated in the requested mobility procedure. In some embodiments of the aspect, the mobility procedure is a handover of the wireless device from the source cell to the target cell. In some embodiments of the aspect, the mobility procedure corresponds to request to at least one of add and change a primary secondary cell, PScell, for the wireless device.

In some embodiments of the aspect, the processing circuitry is configured to cause the network node to determine to prepare the conditional reconfiguration for the wireless device based at least in part on a measurement from the wireless device included in the received request to perform the mobility procedure. In some embodiments of the aspect, the processing circuitry is configured to cause the network node to prepare the conditional reconfiguration for the wireless device by being configured to cause the network node to transmit the RRC reconfiguration for the wireless device to a target candidate network node supporting the target candidate cell; and obtain the conditional reconfiguration from the target candidate network node, the conditional reconfiguration being based at least in part on the transmitted RRC reconfiguration.

In some embodiments of the aspect, at least one of the conditional reconfiguration associated with the target candidate cell and the RRC reconfiguration associated with the target cell of the mobility procedure is based at least in part on the received current configuration for the wireless device in the source cell. In some embodiments of the aspect, the processing circuitry is further configured to cause the network node to receive an RRC reconfiguration complete message; and as a result of the received RRC reconfiguration complete message, communicate with the wireless device based on an assumption that the wireless device is operating according to the conditional reconfiguration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

DETAILED DESCRIPTION

Figure 3:
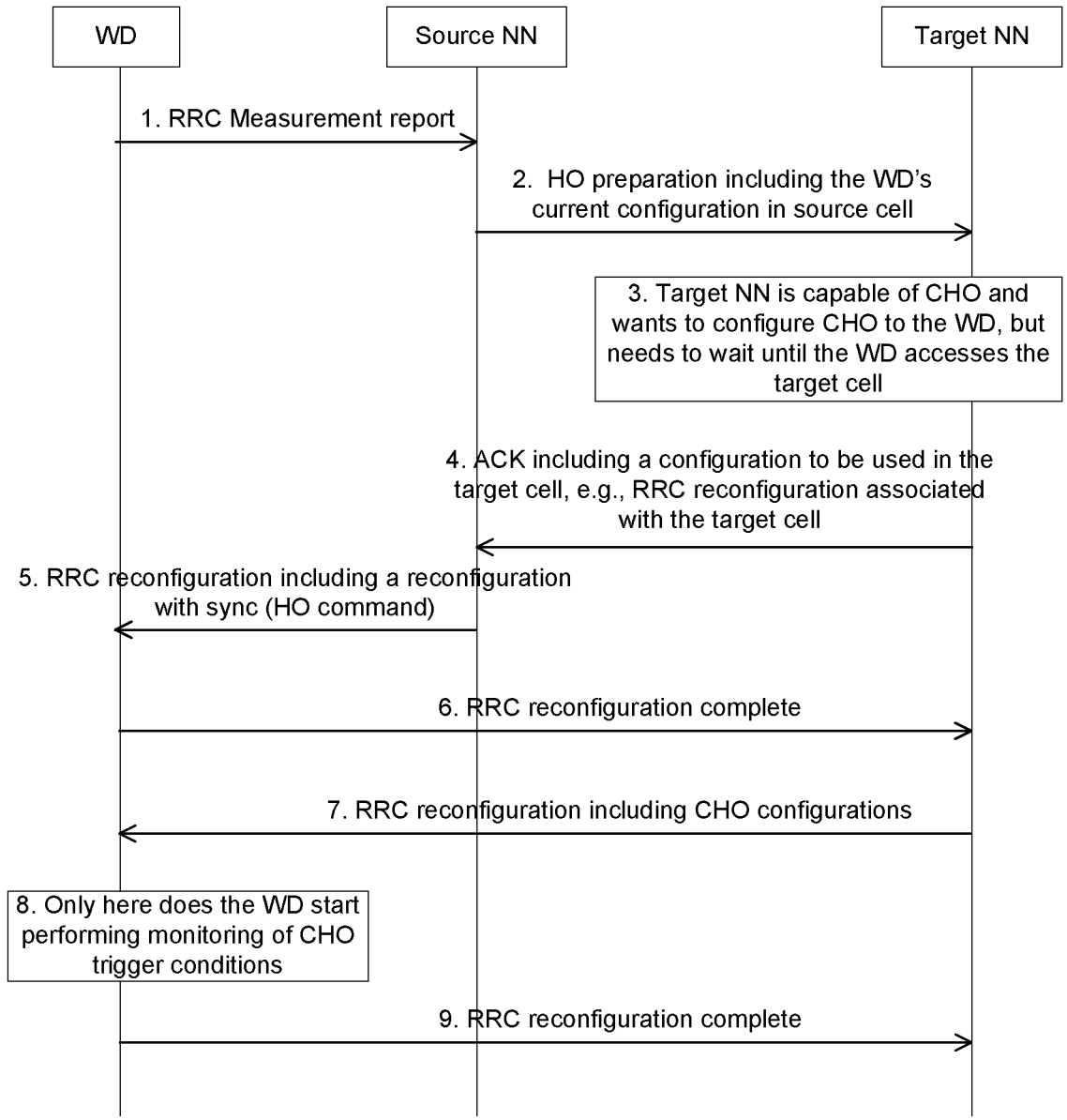
FIG. 3 is a flowchart illustrating another example handover execution.

Using an enhanced version of the RRCReconfiguration to configure CHO may mean that a field/IE (information element) is included with an AddMod/Release structure for CHO. However, the same message could also be used by the network to trigger a handover, where one needs to include a reconfiguration with sync with information associated to the target cell. A use case that was not foreseen by existing considerations is if a target cell in a handover wants to prepare CHO configurations. If the state-of-the-art specifications are followed, and an implementation of current agreements is assumed this may be performed as shown for example in FIG. 3, which is summarized below:

1. WD sends measurement report to source NN;
2. Source network node processes measurement reports and decides to HO the WD to a target cell supported by the target network node;
3. Target network node is capable of CHO and wants to configure CHO to the WD, but needs to wait until the WD accesses the target cell;
4. Target network node prepares and sends a first RRC reconfiguration in a container for the WD, to be transmitted via source network node;
5. WD receives the RRC reconfiguration with reconfiguration with sync from the source network node;
6. WD accesses the target cell and sends an RRC reconfiguration complete message to the target network node;
7. After accessing the target cell, the target network node can now send another, second RRC reconfiguration to the WD including the CHO configurations prepared by/corresponding to the target network node, and possibly associated measurement configurations; and
8. WD can now start performing monitoring of the CHO trigger conditions; and
9. WD then sends another, second RRC reconfiguration complete message to the target network node.

Hence, if the target network node is capable of configuring CHO and wants to do so for an incoming WD in a handover procedure (or any other mobility procedure, such as a primary secondary cell (PSCell) change) the target network node first waits for the WD to access the target cell to then provide a new, second reconfiguration containing the CHO configurations in a new message to that WD, which increases signaling. Also, that new message may need to include measurement configurations associated to the CHO, which postpones the timing for the WD start to perform measurements for the CHO.

Some embodiments of the present disclosure include a method performed by a wireless device (also called a User Equipment—UE) for a reconfiguration procedure, the method including one or more of:

Receiving a message (e.g., a RRCReconfiguration) that includes:
  conditional reconfigurations (e.g., CHO configurations) associated with corresponding target candidate cells, the conditional reconfigurations being prepared by a target cell/target network node (each conditional reconfiguration may include a triggering condition, an associated RRC reconfiguration to be used by the wireless device upon the triggering condition and a target candidate cell identifier identifying the target candidate cell);
  indication that the WD may perform a mobility procedure (e.g., a reconfiguration with sync in the RRCReconfiguration message indicating to the WD to perform a handover of the WD from the source cell to the target cell). That indication may be the presence of a reconfiguration with sync field within the CellGroupConfig;

Upon receiving the message,
  The WD first executes the mobility procedure i.e., the WD accesses the target cell indicated in the mobility procedure indication (e.g., HO command/request, such as reconfiguration with sync), instead of the conditional reconfiguration (e.g., CHO configuration) procedure;
  Only after accessing the target cell does the WD perform the conditional reconfiguration (e.g., CHO configuration) according to the configuration (e.g., RRC reconfiguration) provided in the received message, and starts the actions upon the conditional reconfiguration (e.g., evaluating/monitoring the triggering condition(s) and/or performing a conditional handover of the WD to the target candidate cell upon the triggering condition(s) being met); and/or
In case of failure in performing the mobility procedure (e.g., failure in executing the reconfiguration with Sync):
  Use any of the configured CHO cells as a chosen/selected cell in the following re-establishment procedure, either the earlier configured CHO target cells (e.g., prepared or determined by a source NN supporting the source cell) or the CHO target candidate cells received in the message (e.g., Reconfiguration with Sync message), and perform a handover of the wireless device to the selected cell instead of a re-establishment.

Some embodiments of the present disclosure include a method performed by a target network node (also called a target gNodeB) for a reconfiguration procedure including conditional reconfigurations (e.g., CHO configurations), the method including one or more of:

Receiving from a source network node (e.g. in a handover preparation procedure) the WD's current configuration (i.e., configuration being used in the source cell) in a handover/reconfiguration with sync/PSCell change request message; that message may include measurements performed and reported by the WD e.g., in the inter-node RRM container;

Determining to prepare one or more conditional reconfigurations (e.g., configure CHO) for that incoming WD; hence, including the conditional reconfigurations in the WD's target configuration according to the target NN to be provided to the WD by the source NN; this is what is may be included in an RRC container from sent from the target NN to the source NN in the HO preparation procedure;

That decision to include conditional reconfigurations corresponding to (i.e., prepared by) the target network node may possibly be determined by the target network node based on e.g., measurements from the WD included in the inter-node message from the source network node in the HO command/request, as described above.

If the target candidate cells for the conditional reconfigurations (e.g., CHO configurations) to be given to the WD are not within/supported by the same target network node (e.g., target candidate cells in/supported by other neighbor network nodes), the target network node initiates a conditional reconfiguration preparation procedure (which may be a HO preparation procedure with an indication that this is for CHO) with the NNs supporting the target candidate cells by sending e.g., a target WD configuration i.e., the WD configuration that is going to be used in the target cell after the WD accesses it. For that purpose, the target network node (e.g., target gNodeB) may create a WD's full configuration, based on the WD's current configuration in the source cell and what the target network node wants to modify, so that each NN supporting a target candidate cell understands what kind of reconfiguration is requested to prepare for these conditional reconfigurations.

In another alternative, only full-configuration is allowed to be prepared by the NNs supporting the target candidate cells in HO.

Transmitting to the source network node (e.g., in a handover preparation procedure acknowledgment (ACK) message) the WD's configuration (e.g., container with an RRCReconfiguration containing a reconfiguration with sync and the conditional reconfiguration) to be used in the target cell upon handover execution, including the conditional reconfigurations. Each conditional reconfiguration is per target candidate cell and may include a trigger condition configuration (which may be one or multiple measurement identities associated to a measurement configuration) and a configuration associated with the target candidate cell (which may be an RRCReconfiguration, either full-configuration or delta-configuration having as a baseline the WD's target configuration to be used after the WD accesses the target cell).

Receiving an RRCReconfigurationComplete message from that incoming WD (where the WD uses the configuration associated with the target candidate cell) and understanding that the incoming WD is performing actions according to the provided conditional reconfiguration such as the monitoring of triggering conditions that have been configured.

Some embodiments advantageously provide that, by adding conditional reconfiguration (e.g., CHO configuration) in an RRCReconfiguration including a HO command to a given target cell (i.e., also including in the RRCReconfiguration a reconfiguration with sync/HO command/PSCell change command), the amount of signaling used to configure a CHO may be reduced e.g., in the case that the target cell for an incoming WD is capable of conditional reconfiguration (e.g., CHO) and wants to configure CHO for its WDs. In addition to signaling benefits some embodiments also reduce the delay to make the conditional reconfigurations available to WDs, which may reduce the chances of mobility failures.

Some embodiments may also solve ambiguities if both configurations (i.e., both the conditional reconfiguration associated with the target cell/target network node and the RRC reconfiguration associated with the mobility procedure from the source to target cell) (e.g., CHO related fields/ information elements (IEs) and HO/Reconfiguration with sync/PSCell change/addition related fields/IEs) are signaled in the same message e.g., an RRCReconfiguration message. For example, in some embodiments, when both configurations are included, the WD may be aware that the RRCReconfiguration message is an HO command that includes conditional (e.g., CHO) reconfigurations prepared by the target network node, i.e., the WD may access the target cell and then operate according to the conditional reconfigurations (e.g., configure CHO), instead of the other way around, which could create issues in cases where, for example, the WD first applies CHO configuration and having available measurements CHO execution is triggered and it becomes unclear which HO the WD executes).

In some embodiments, there may be an explicit indication so that the WD does not start to apply the conditional reconfigurations (i.e., start monitoring conditions) upon reception of the RRCReconfiguration message, but only upon accessing the target cell indicated in the RRCReconfiguration message. In some embodiments, this behavior may be predefined in e.g., a standards document.

Another benefit of some embodiments may be the fact that the method works regardless of if the source network node is capable or not of conditional reconfiguration. In other words, the WD may be capable of conditional reconfiguration, the target network node may be capable of conditional reconfiguration, and upon HO configure the WD with the conditional reconfiguration. In some embodiments, this may be transparent to the source NN. Alternatively, if the WD has conditional reconfigurations in the source cell, delta signaling from target NN to source NN for the conditional reconfiguration may be supported to further reduce conditional reconfigurations.

Another benefit of some embodiments is that in case the mobility procedure, such as handover (reconfiguration with sync) fails, the WD has more cells that it can choose from in the following re-configuration procedure and possibly perform a handover instead of a re-establishment. There may also be an explicit indication if the WD is allowed to use only the target cells received from source, only the target cells received from target, or both.

Before describing in detail exemplary embodiments, it is noted that the embodiments reside primarily in combinations of apparatus components and processing steps related to conditional handover in handover command. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the terms "conditional reconfiguration," "CHO configuration," "conditional handover related configuration," "configuration of a conditional handover," "conditional reconfiguration with sync," "RRC connection reconfiguration with mobility control information", "conditional reconfiguration," and "conditional RRC Reconfiguration" may be used herein interchangeably.

In some embodiments, the terms "node," "network node," and "cell" may be used interchangeably and may be used to indicate a network node providing one or more cells and/or the cell (e.g., source sell, target cell, candidate cell, etc.) provided by such node/network node.

Similarly, in some embodiments, the terms "source" or "target" or "candidate" are used and may be a shortened form of the terms "source node/cell", "target network node/cell" or "candidate node/cell", respectively.

In some embodiments, the terms "target node" and "target network node" are used interchangeably.

In some embodiments, the term "target cell" may be considered a cell that is the target of a handover command/request and may be supported by a target network node. In some embodiments, the term "target candidate cell" may be considered to be a cell that is a candidate for conditional reconfiguration as determined and/or obtained by the target network node e.g., in a handover preparation procedure from a source cell to the target cell.

A cell may be generally a communication cell, e.g., of a cellular or mobile communication network, provided by a node. A serving cell may be a cell on or via which a network node (the node providing or associated to the cell, e.g., base station or eNodeB or gNB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow a standard, such as an NR and/or an LTE-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB or gNB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB or gNB, may be adapted to provide and/or define and/or control one or more cells, e.g., a PCell and/or a LA cell.

Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc. The inter-frequency and inter-RAT measurements are carried out by the WD in measurement gaps unless the WD is capable of doing such measurement without gaps. Examples of measurement gaps are measurement gap id #0 (each gap of 6 ms occurring every 40 ms), measurement gap id #1 (each gap of 6 ms occurring every 80 ms), etc. The measurement gaps are configured at the WD by the network node.

In some embodiments, information on one or more resources may be considered to be transmitted in a message having a specific format. A message may comprise or represent bits representing payload information and coding bits, e.g., for error coding.

Receiving (or obtaining) information may comprise receiving one or more information messages (e.g., RRC reconfiguration). It may be considered that receiving control signaling comprises demodulating and/or decoding and/or detecting, e.g. blind detection of, one or more messages, in particular a message carried by the signaling, e.g. based on an assumed set of resources, which may be searched and/or listened for the information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for conditional handover in handover command.

Figure 4:
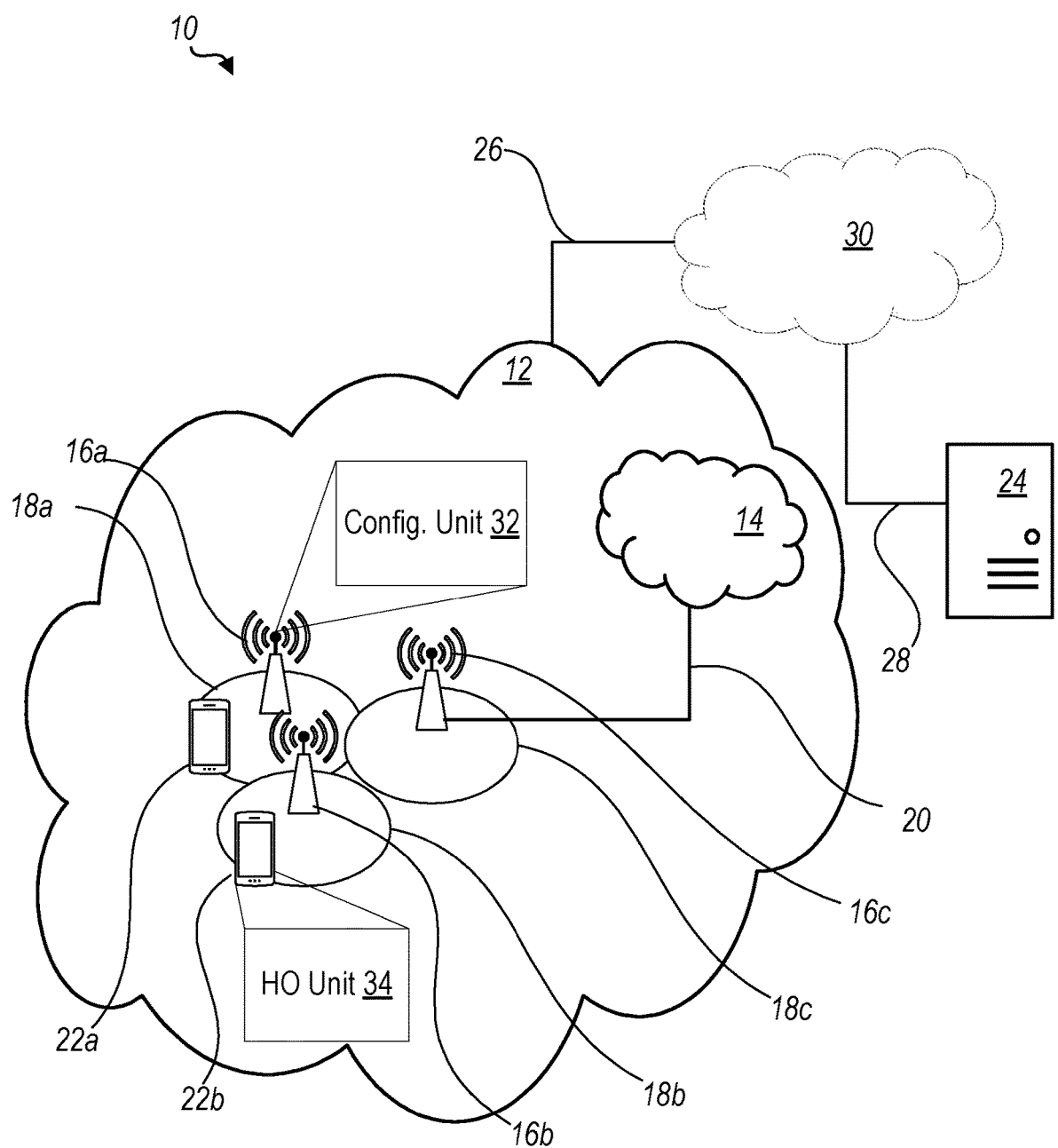
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to cause the network node 16 to receive a request to perform a mobility procedure for a wireless device from a source cell supported by a source network node to a target cell supported by the network node, the request including a current configuration for the wireless device in the source cell; upon receiving the request, determine to prepare a conditional reconfiguration for the wireless device; and transmit the conditional reconfiguration and a radio resource control, RRC, reconfiguration for the wireless device, the RRC reconfiguration being associated with the requested mobility procedure from the source cell to the target cell supported by the network node and the conditional reconfiguration being associated with a target candidate cell determined by the network node. In some embodiments, the configuration unit 32 may be configured to cause the network node 16 to one or more of: receive a handover (HO) preparation message from a source network node in an HO procedure, the HO preparation message including a current configuration of the WD in a source cell; determine to configure a conditional handover (CHO) for the WD; and transmit a message to the source node, the message including the determined CHO configuration.

A wireless device 22 is configured to include a handover unit 34 which is configured to cause the wireless device 22 to receive at least one radio resource control, RRC, reconfiguration message, the at least one RRC reconfiguration message including a conditional reconfiguration and an indication that the wireless device is to perform a mobility procedure, the indication to perform the mobility procedure indicating to perform the mobility procedure from a source cell supported by the network node to a target cell supported by a target network node, and the conditional reconfiguration being associated with a target candidate cell corresponding to the target network node. In some embodiments, the handover unit 34 is configured to cause the wireless device 22 to receive a message, the message being a radio resource control (RRC) reconfiguration message that includes a conditional handover (CHO) configuration and an indication of a handover (HO) command, the CHO prepared by a target network node and the HO command prepared by a source node; responsive to the received message, attempt to access the target network node indicated in the HO command; and/or as a result of accessing the target network node, perform the CHO according to the CHO configuration in the received message.

Figure 1:
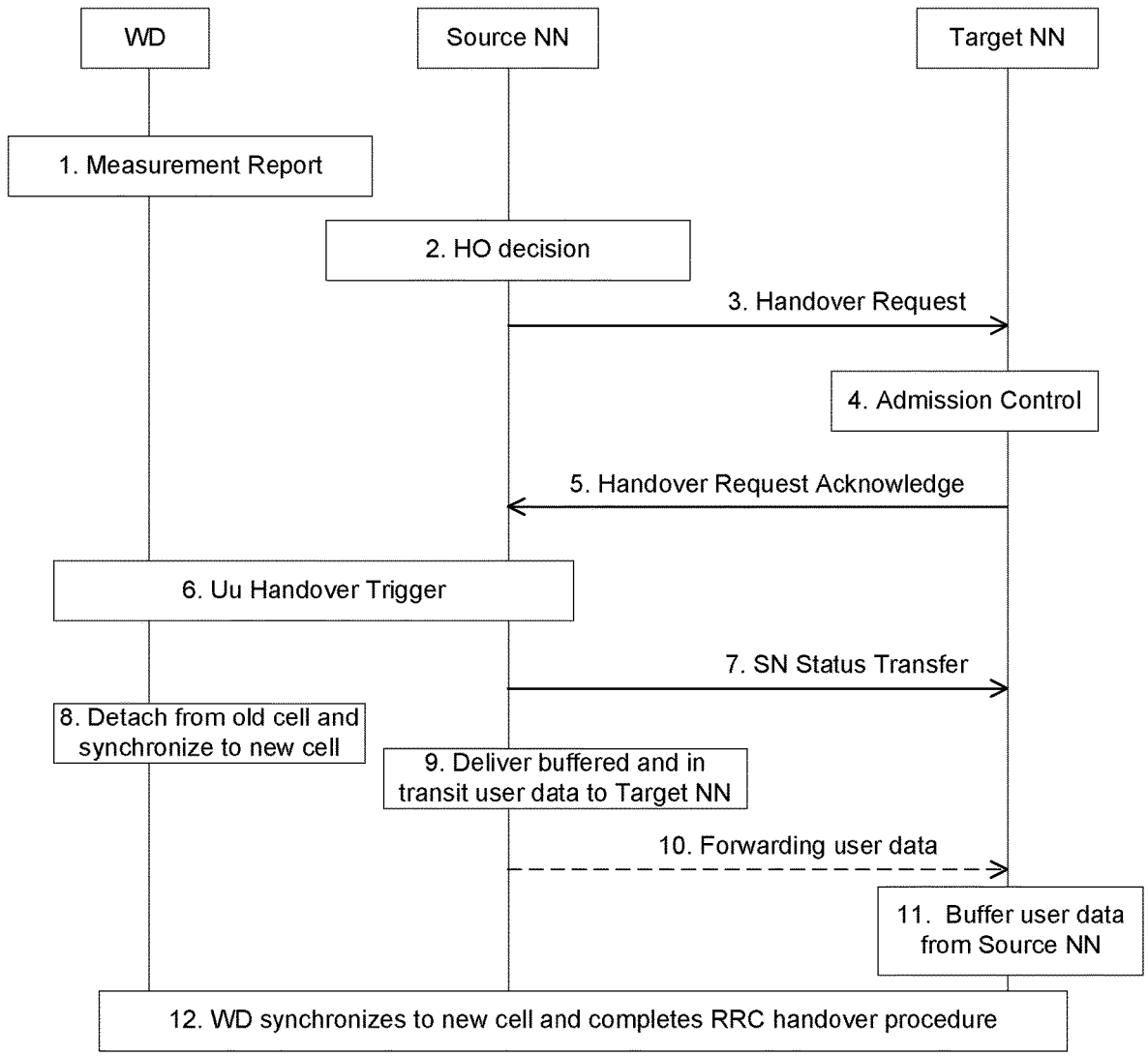
FIG. 1 is a flowchart illustrating an example handover execution.
Figure 2:
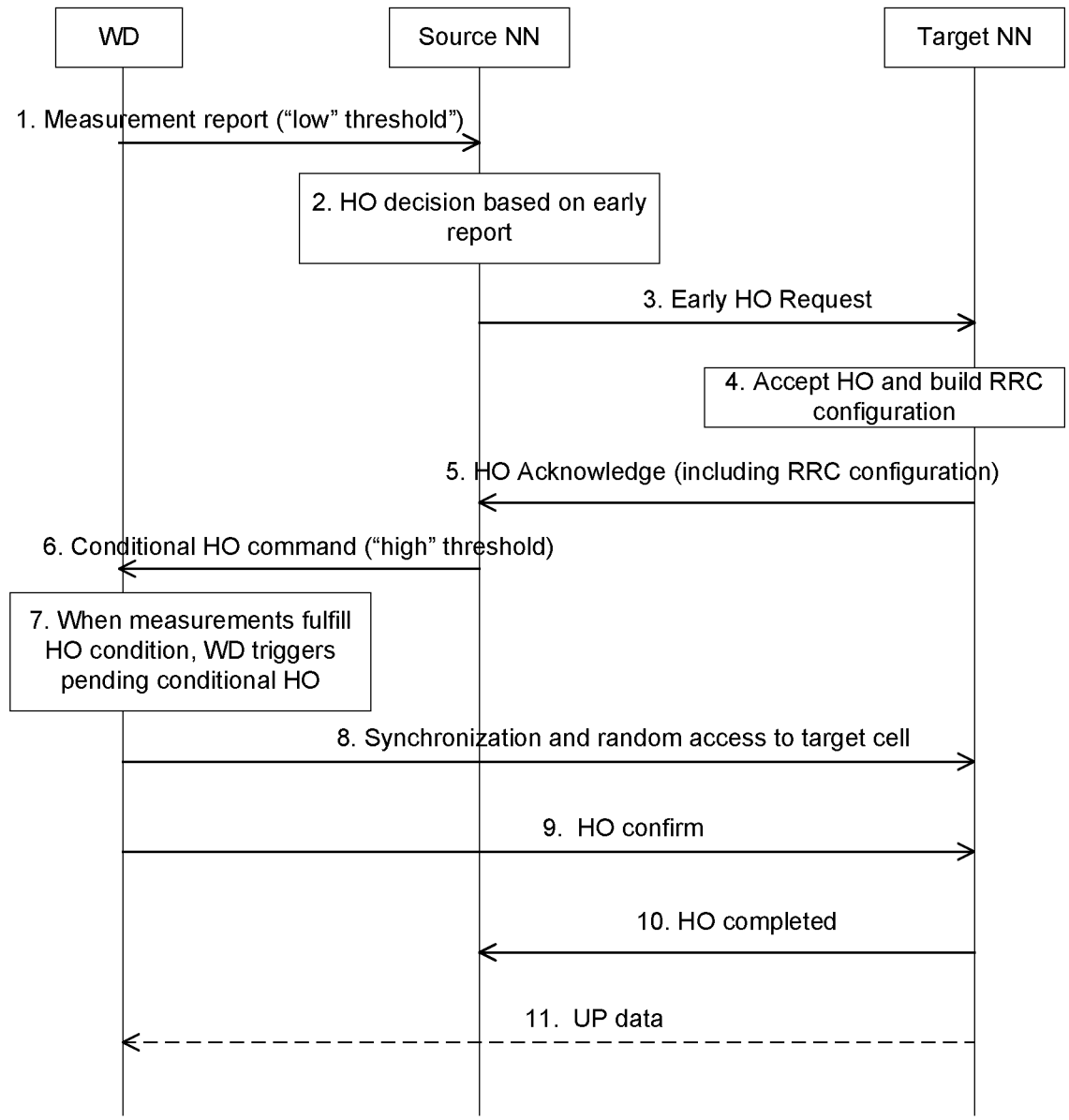
FIG. 2 is a flowchart illustrating an example conditional handover execution.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform network node methods discussed herein, such as the methods discussed with reference to FIG. 10 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a handover unit 34 configured to perform WD methods discussed herein, such as the methods discussed with reference to FIG. 11 as well as other figures.

Figure 5:
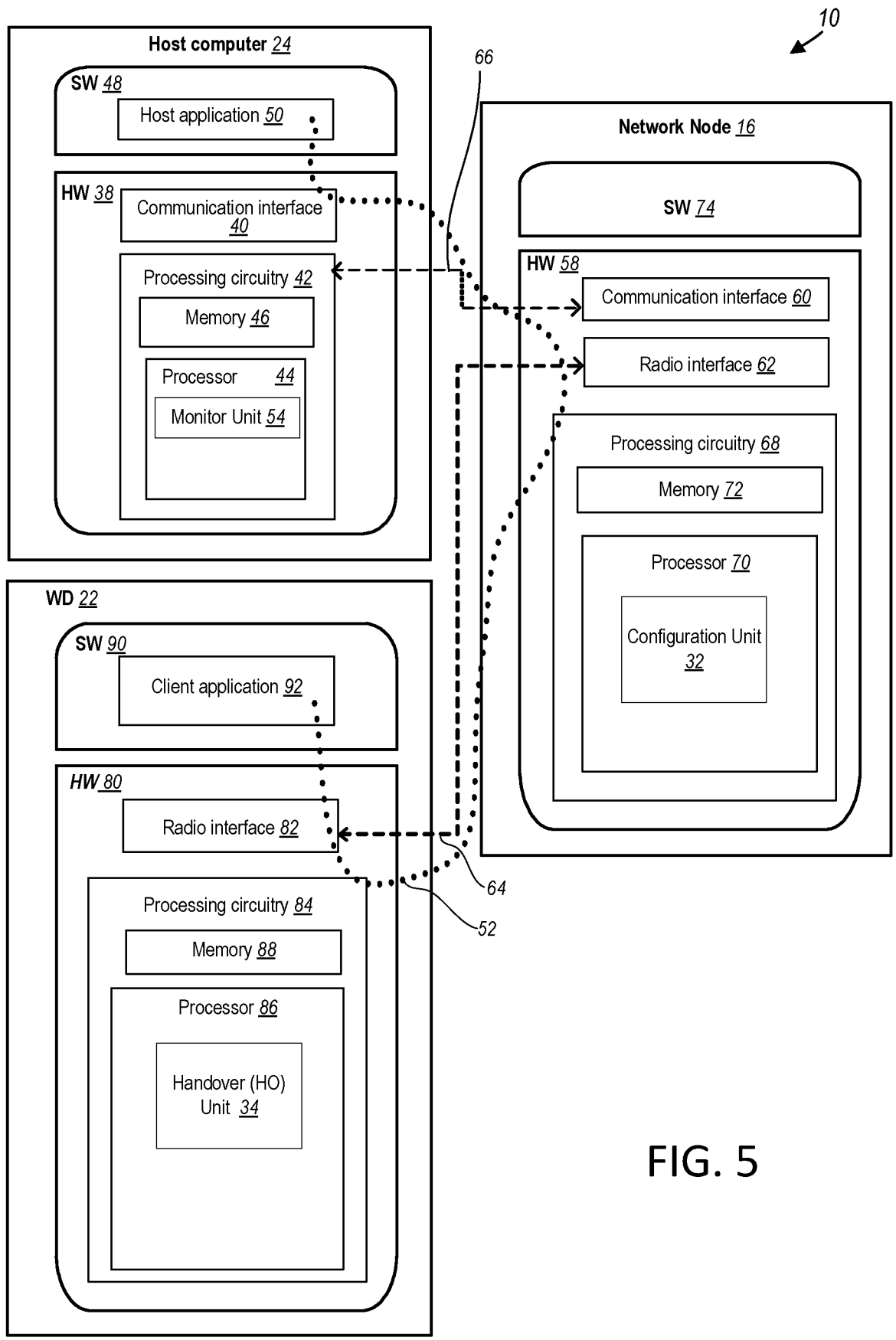
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as configuration unit 32, and handover unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
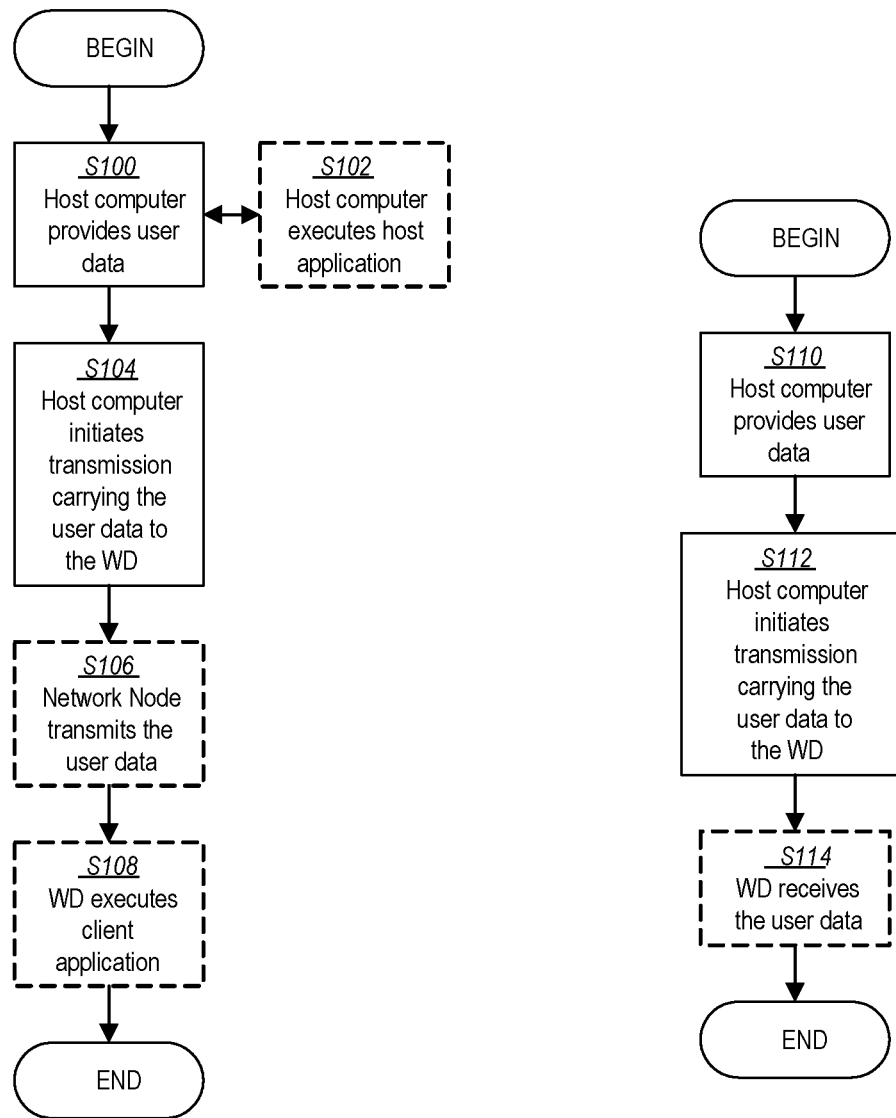
FIG. 6 is a flowchart illustrating exemplary methods implemented in a communication system including a host computer, a network node and a wireless device for executing a client application at a wireless device according to some embodiments of the present disclosure.
FIG. 7 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
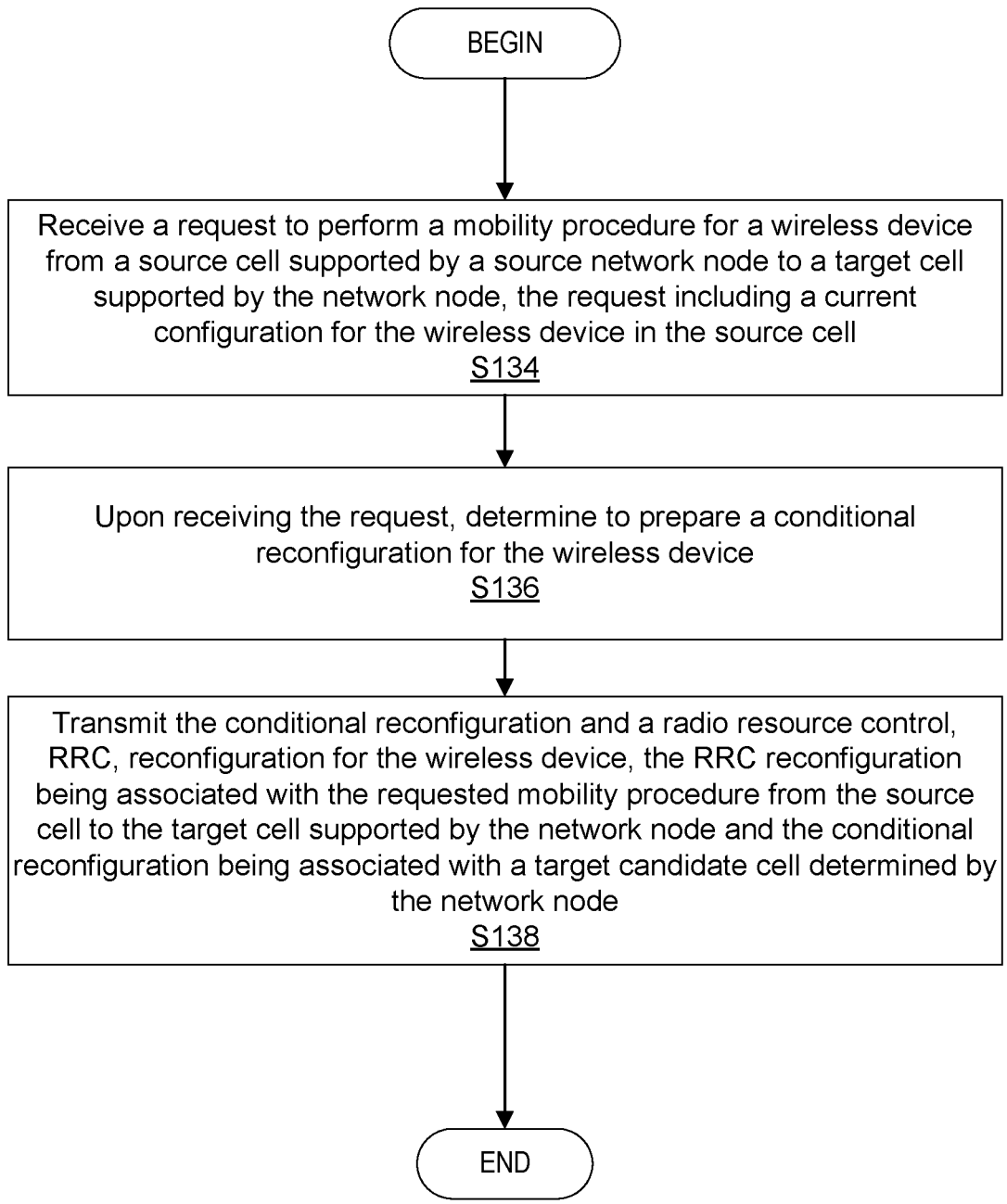
FIG. 10 is a flowchart of an exemplary process in a network node for configuration unit according to some embodiments of the present disclosure.

FIG. 10 is a flowchart of an exemplary process in a network node 16 for conditional handover in handover command according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method. The example method includes receiving (Block S134), such as via configuration unit 32, processing circuitry 68, processor 70, communication interface 60 and/or radio interface 62, a request to perform a mobility procedure for a wireless device from a source cell supported by a source network node to a target cell supported by the network node, the request including a current configuration for the wireless device in the source cell. The method includes upon receiving the request, determining (Block S136), such as via configuration unit 32, processing circuitry 68, processor 70, communication interface 60 and/or radio interface 62, to prepare a conditional reconfiguration for the wireless device. The method includes transmitting (Block S138), such as via configuration unit 32, processing circuitry 68, processor 70, communication interface 60 and/or radio interface 62, the conditional reconfiguration and a radio resource control, RRC, reconfiguration for the wireless device, the RRC reconfiguration being associated with the requested mobility procedure from the source cell to the target cell supported by the network node and the conditional reconfiguration being associated with a target candidate cell determined by the network node.

In some embodiments, the conditional reconfiguration is to be used by the wireless device after accessing the target cell indicated in the requested mobility procedure. In some embodiments, the target candidate cell associated with the conditional reconfiguration is selectable by the wireless device for a handover of the wireless device to the target candidate cell upon a failure to access the target cell indicated in the requested mobility procedure. In some embodiments, the target candidate cell associated with the conditional reconfiguration is not selectable by the wireless device for a handover of the wireless device to the target candidate cell upon a failure to access the target cell indicated in the requested mobility procedure.

In some embodiments, the mobility procedure is a handover of the wireless device from the source cell to the target cell. In some embodiments, the mobility procedure corresponds to request to at least one of add and change a primary secondary cell, PScell, for the wireless device. In some embodiments, the determining to prepare the conditional reconfiguration for the wireless device is based at least in part on a measurement from the wireless device included in the received request to perform the mobility procedure. In some embodiments, preparing the conditional reconfiguration for the wireless device comprises transmitting, such as via configuration unit 32, processing circuitry 68, processor 70, communication interface 60 and/or radio interface 62, the RRC reconfiguration for the wireless device to a target candidate network node supporting the target candidate cell. The method includes obtaining, such as via configuration unit 32, processing circuitry 68, processor 70, communication interface 60 and/or radio interface 62, the conditional reconfiguration from the target candidate network node, the conditional reconfiguration being based at least in part on the transmitted RRC reconfiguration.

In some embodiments, at least one of the conditional reconfiguration associated with the target candidate cell and the RRC reconfiguration associated with the target cell of the mobility procedure is based at least in part on the received current configuration for the wireless device in the source cell. In some embodiments, the method further includes receiving, such as via configuration unit 32, processing circuitry 68, processor 70, communication interface 60 and/or radio interface 62, an RRC reconfiguration complete message; and as a result of the received RRC reconfiguration complete message, communicating, such as via radio interface 62, with the wireless device based on an assumption that the wireless device is operating according to the conditional reconfiguration.

In some embodiments, the method includes receiving, such as via configuration unit 32, processing circuitry 68, processor 70 and/or radio interface 62, a handover (HO) preparation message from a source network node in a HO procedure, the HO preparation message including a current configuration of the WD in a source cell. The method includes determining, such as via configuration unit 32, processing circuitry 68, processor 70 and/or radio interface 62, to configure a conditional handover (CHO) for the WD. The method includes transmitting, such as via configuration unit 32, processing circuitry 68, processor 70 and/or radio interface 62, a message to the source node, the message including the determined CHO configuration. In some embodiments, the method includes receiving a radio resource control (RRC) reconfiguration complete message from the WD 22; and/or as a result of the received RRC reconfiguration complete message, communicating with the WD 22 based on an assumption that the WD i22 s operating according to the CHO configuration.

Figure 11:
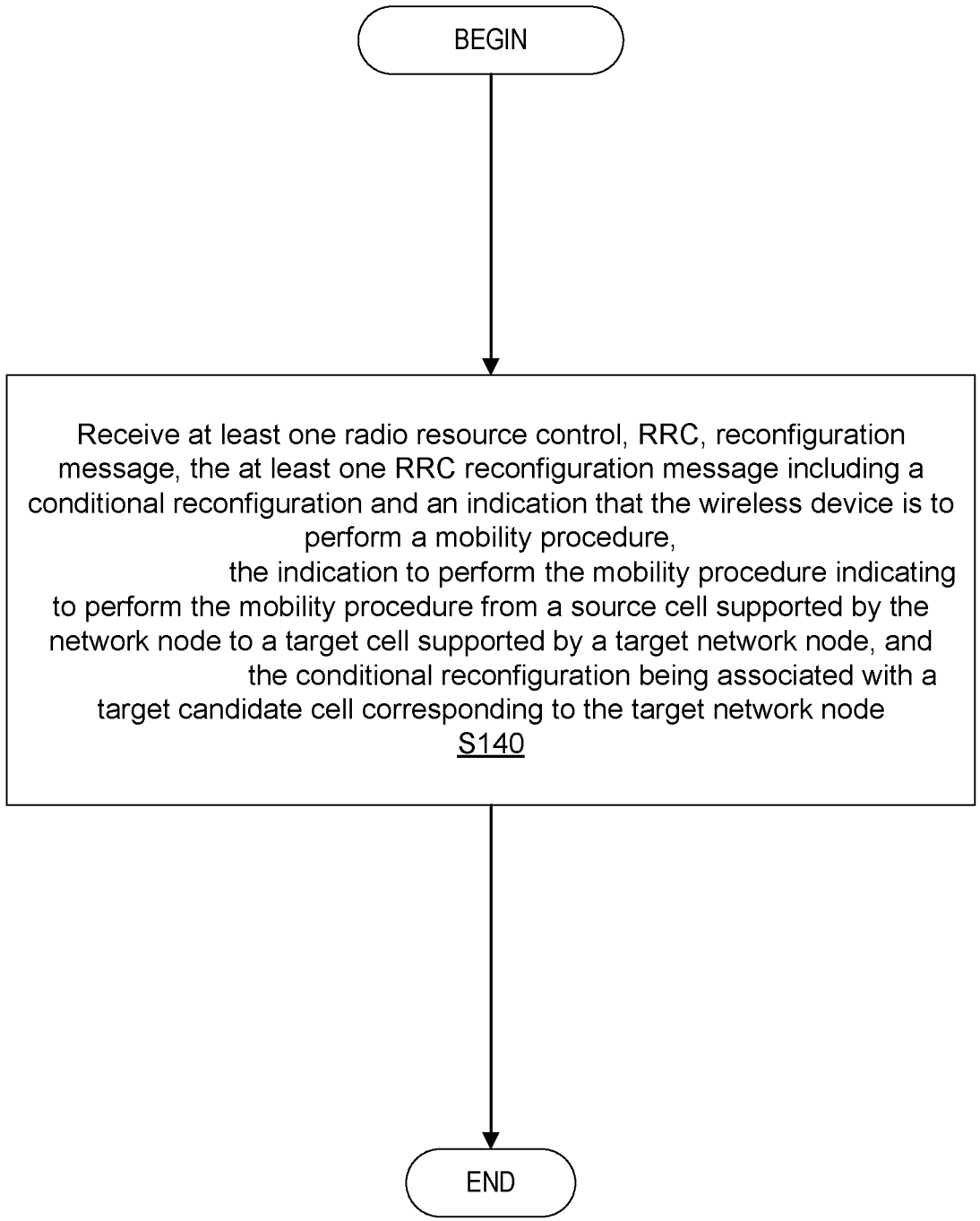
FIG. 11 is a flowchart of an exemplary process in a wireless device for handover unit according to some embodiments of the present disclosure.

FIG. 11 is a flowchart of an exemplary process in a wireless device 22 for conditional handover in handover command according to some embodiments of the present disclosure. One or more Blocks and/or functions and/or methods performed by WD 22 may be performed by one or more elements of WD 22 such as by HO unit 34 in processing circuitry 84, processor 86, radio interface 82, etc. The example method includes receiving (Block S140), such as via HO unit 34, processing circuitry 84, processor 86 and/or radio interface 82, at least one radio resource control, RRC, reconfiguration message, the at least one RRC reconfiguration message including a conditional reconfiguration and an indication that the wireless device is to perform a mobility procedure. The indication to perform the mobility procedure indicates to perform the mobility procedure from a source cell supported by the network node to a target cell supported by a target network node. The conditional reconfiguration is associated with a target candidate cell corresponding to the target network node.

In some embodiments, the method further includes upon receiving the at least one RRC reconfiguration message, performing, such as via HO unit 34, processing circuitry 84, processor 86 and/or radio interface 82, the mobility procedure indicated in the received at least one RRC reconfiguration by attempting to access the target cell. In some embodiments, the method includes as a result of accessing the target cell, performing, such as via HO unit 34, processing circuitry 84, processor 86 and/or radio interface 82, at least one action according to the conditional reconfiguration comprised in the received at least one RRC reconfiguration. In some embodiments, the method further includes as a result of a failure in the attempt to access the target cell, selecting a candidate cell associated with a conditional handover and performing a handover of the wireless device to the selected candidate cell.

In some embodiments, selecting the candidate cell associated with the conditional handover comprises as the result of the failure in the attempt to access the target cell, selecting, such as via HO unit 34, processing circuitry 84, processor 86 and/or radio interface 82, the candidate cell from among at least a plurality of candidate cells, each candidate cell being associated with a respective conditional handover and the target network node. In some embodiments, selecting the candidate cell associated with the conditional handover comprises as the result of the failure in the attempt to access the target cell, selecting, such as via HO unit 34, processing circuitry 84, processor 86 and/or radio interface 82, the candidate cell from among at least a plurality of candidate cells, each candidate cell being associated with a respective conditional handover and the network node supporting the source cell.

In some embodiments, an explicit indication indicates to the wireless device to select the candidate cell from among at least one of a first plurality of candidate cells associated with the network node supporting the source cell and a second plurality of candidate cells associated with the target network node as the result of the failure in the attempt to access the target cell. In some embodiments, the conditional reconfiguration and the indication to perform the mobility procedure are both included in a same RRC reconfiguration message. In some embodiments, an explicit indication indicates to the wireless device to perform the conditional reconfiguration comprised in the same RRC reconfiguration message only after accessing the target cell according to the mobility procedure indicated in the same RRC reconfiguration message.

In some embodiments, the conditional reconfiguration and the indication to perform the mobility procedure are prohibited from being in a same RRC reconfiguration message. In some embodiments, the method further includes when the conditional reconfiguration and the indication to perform the mobility procedure are included in a same RRC reconfiguration message, performing, such as via HO unit 34, processing circuitry 84, processor 86 and/or radio interface 82, an RRC re-establishment procedure, instead of the indicated mobility procedure and the conditional reconfiguration. In some embodiments, the mobility procedure is a handover of the wireless device from the source cell to the target cell. In some embodiments, the mobility procedure corresponds to request to at least one of add and change a primary secondary cell, PScell, for the wireless device. In some embodiments, the indication to perform the mobility procedure includes one of a reconfiguration with sync field and a mobility control information field comprised in the at least one RRC reconfiguration message.

In some embodiments, the method further includes receiving, such as via HO unit 34, processing circuitry 84, processor 86 and/or radio interface 82, signaling indicating to one of add, modify and release the conditional reconfiguration of the target candidate cell prepared by the target network node. In some embodiments, the conditional reconfiguration associated with the target candidate cell includes a trigger condition configuration, the trigger condition configuration including a set of pointers to at least one measurement identifier, and each measurement identifier of the at least one measurement identifier is associated with at least one trigger condition and an RRC reconfiguration. In some embodiments, the method further includes determining, such as via HO unit 34, processing circuitry 84, processor 86 and/or radio interface 82, to not transmit a RRC reconfiguration complete message based at least in part on a presence of the conditional reconfiguration associated with the target candidate cell in the at least one RRC reconfiguration message.

In some embodiments, the method includes receiving, such as via HO unit 34, processing circuitry 84, processor 86 and/or radio interface 82, a message. The message may be a radio resource control (RRC) reconfiguration message that includes a conditional handover (CHO) configuration and an indication of a handover (HO) command, the CHO prepared by a target network node and the HO command prepared by a source network node. The method includes, responsive to the received message, attempting, such as via HO unit 34, processing circuitry 84, processor 86 and/or radio interface 82, to access the target network node indicated in the HO command. The method includes, as a result of accessing the target network node, performing, such as via HO unit 34, processing circuitry 84, processor 86 and/or radio interface 82, the CHO according to the CHO configuration in the received message. In some embodiments, the method includes responsive to a HO failure while attempting to access the target network node, selecting a candidate cell indicated in the CHO configuration and perform a handover of the WD to the selected candidate cell.

Having described the general process flow of arrangements of the disclosure and having provided examples of hardware and software arrangements for implementing the processes and functions of the disclosure, the sections below provide details and examples of arrangements for conditional handover in handover command, which may be implemented by the network node 16, wireless device 22 and/or host computer 24.

Introduction

In some embodiments, a WD 22 configured with a set of conditional reconfigurations (e.g., RRCReconfiguration(s)), for example, as via configuration of CHO may execute a handover (or conditional handover, depending how the procedure will be called in NR RRC specifications) when the condition for the handover is fulfilled. In the context of this disclosure, the disclosure may refer to conditional reconfiguration, CHO configuration, or conditional handover related configuration interchangeably and which may be for a cell, list of cell(s), measurement object(s) or frequencies. In the case of the cell association, they may be for the same radio access technology (RAT), or for a different RAT.

In the context of the method, the "conditional handover related configuration(s)", also called conditional reconfiguration(s) for a cell may include one or more of at least the following:

An RRCReconfiguration-like message (or any message with equivalent content and/or purpose), possibly containing a reconfigurationWithSync IE using NR terminology (defined in 3GPP Technical Specification (TS) 38.331) and prepared by a target network node 16. Or, using the E-UTRA terminology, an RRCConnectionReconfiguration with a mobilityControlInfo IE (defined in 3GPP Technical Specification (TS) 36.331);

Triggering condition(s) configuration e.g., such as A1-A6 triggering events or B1-B2 inter-RAT triggering events (as defined in 3GPP TS 38.331/3GPP TSA 36.331 in the reportConfig IE) where instead of triggering a measurement report it would trigger a conditional handover. That may be a pointer to a measurement configuration such as a measurement identifier or a list of measurement identifiers. Other conditional handover controlling parameters e.g., timer defining the validity of target candidate resources, etc.

Throughout the disclosure the term "handover" or "reconfiguration with sync" is used herein e.g., with a similar meaning. Hence, a conditional handover may also be called a conditional reconfiguration with sync. In NR terminology, the handovers are typically called an RRCReconfiguration with a reconfigurationWithSync (field containing configuration necessary to execute a handover, such as target information such as frequency, cell identifier, random access configuration, etc.). In E-UTRA terminology, the handovers are typically called an RRCConnectionReconfiguration with a mobilityControlInfo (field containing configuration necessary to execute a handover). Fundamentally, the disclosure is also applicable for other forms of mobility procedure such as a PSCell change, PSCell addition, etc.

In some embodiments, most of the WD 22 (and network node 16) actions defined in the disclosure and network node 16 configurations are described as being performed in NR or E-UTRA; in other words, the conditional reconfiguration (e.g., configuration of a conditional HO) received in NR for NR cells. However, the techniques, methods and/or principles are also applicable when any of these steps occurs in different RATs, for example:

WD 22 has NR as source and NR as target; target candidates associated to the NR target may be LTE cells or NR cells;

WD 22 has NR as source and LTE as target; target candidates associated to the NR target may be LTE cells or NR cells;

WD 22 has LTE as source and LTE as target; target candidates associated to the NR target may be LTE cells or NR cells; and/or WD 22 has LTE as source and NR as target; target candidates associated to the NR target may be LTE cells or NR cells.

Further Example Details and Example Signaling Flows of Some Embodiments

The disclosure describes a method performed by a wireless device 22 (also called a User Equipment—UE) for a reconfiguration procedure. In some embodiments, the method includes:

Receiving a message (e.g. a RRCReconfiguration) that includes:
conditional reconfigurations (e.g., CHO configurations) prepared by a target network node 16 supporting a target cell;
indication that the WD 22 may perform a mobility procedure (e.g., Reconfiguration with Sync indicating a handover of the WD 22 from the source cell to a target cell). That indication may be the presence of a reconfiguration with sync field within the CellGroupConfig.

The following sections may provide examples of how the RRC specification may be modified or specified to provide for one or more of the arrangements proposed in the present disclosure, such as the WD 22 receiving the message above. RRC Reconfiguration (Both Conditional Reconfiguration and Reconfiguration with Sync Allowed in a Same RRC Reconfiguration Message)

One example of how that could be implemented in ASN.1 in the RRC specifications is shown below, where the possibility to signal both of these: conditional reconfigurations (e.g., CHO configurations) and a mobility procedure request (e.g., a HO command), is considered.

The RRCReconfiguration message is the command to modify an RRC connection e.g., to a particular cell (e.g., a source cell). It may convey information for measurement configuration, mobility control, radio resource configuration (including resource blocks (RBs), MAC main configuration and physical channel configuration, etc.) and AS security configuration. It may also convey a conditional reconfiguration in a container having an RRCReconfiguration to only be applied upon the fulfilment of a trigger condition.

Signalling radio bearer: SRB1 or SRB3
Radio Link Control—Service Access Point (RLC-SAP): Acknowledgement Mode (AM)
Logical channel: dedicated control channel (DCCH)
Direction: Network node 16 to WD 22 (e.g., UE)

RRCReconfiguration Message

```
-- ASN1START
-- TAG-RRCRECONFIGURATION-START
RRCReconfiguration ::=                  SEQUENCE {
    rrc-TransactionIdentifier              RRC-TransactionIdentifier,
    criticalExtensions                  CHOICE {
        rrcReconfiguration                  RRCReconfiguration-IEs,
        criticalExtensionsFuture            SEQUENCE { }
    }
}
RRCReconfiguration-IEs ::=              SEQUENCE {
    radioBearerConfig                       RadioBearerConfig
OPTIONAL, -- Need M
    secondaryCellGroup                          OCTET STRING (CONTAINING
CellGroupConfig)                        OPTIONAL, -- Need M
    measConfig                          MeasConfig
OPTIONAL, -- Need M
    lateNonCriticalExtension                OCTET STRING
OPTIONAL,
    nonCriticalExtension                    RRCReconfiguration-v1530-IEs
OPTIONAL
}
RRCReconfiguration-v1530-IEs ::=                SEQUENCE {
    masterCellGroup                     OCTET STRING (CONTAINING
CellGroupConfig)                        OPTIONAL, -- Need M
    fullConfig                      ENUMERATED {true}
OPTIONAL, -- Cond FullConfig
    dedicatedNAS-MessageList                    SEQUENCE (SIZE(1..maxDRB)) OF
DedicatedNAS-Message                    OPTIONAL, -- Cond nonHO
    masterKeyUpdate                     MasterKeyUpdate
OPTIONAL, -- Cond MasterKeyChange
    dedicatedSIB1-Delivery                  OCTET STRING (CONTAINING SIB1)
OPTIONAL, -- Need N
    dedicatedSystemInformationDelivery              OCTET STRING (CONTAINING
SystemInformation)                      OPTIONAL, -- Need N
    otherConfig                     OtherConfig
OPTIONAL, -- Need M
    nonCriticalExtension                    RRCReconfiguration-v1540-IEs
OPTIONAL
}
RRCReconfiguration-v1540-IEs ::=                SEQUENCE {
    otherConfig-v1540                   OtherConfig-v1540
OPTIONAL, -- Need M
    nonCriticalExtension                    RRCReconfiguration-v1560-IEs
OPTIONAL
}
RRCReconfiguration-v1560-IEs ::=                SEQUENCE {
    mrdc-SecondaryCellGroupConfig                   SetupRelease { MRDC-
SecondaryCellGroupConfig }                      OPTIONAL,  -- Need M
    radioBearerConfig2                  OCTET STRING (CONTAINING
RadioBearerConfig)                      OPTIONAL,  -- Need M
    sk-Counter                      SK-Counter
OPTIONAL,  -- Need N
    nonCriticalExtension                    RRCReconfiguration-v16-IEs
OPTIONAL
}
RRCReconfiguration-v16-IEs ::=                  SEQUENCE {
    conditionalReconfiguration                  ConditionalReconfiguration
                                        OPTIONAL,  -- Need M
    nonCriticalExtension                    SEQUENCE { } OPTIONAL
}
MasterKeyUpdate ::=                 SEQUENCE {
    keySetChangeIndicator                   BOOLEAN,
    nextHopChainingCount                    NextHopChainingCount,
    nas-Container                   OCTET STRING
OPTIONAL,   -- Cond securityNASC
    ...
}
```

```
MRDC-SecondaryCellGroupConfig ::=           SEQUENCE {
   mrdc-ReleaseAndAdd                       ENUMERATED {true}
OPTIONAL,   -- Need N
   mrdc-SecondaryCellGroup                  CHOICE {
       nr-SCG                               OCTET STRING (CONTAINING
RRCReconfiguration),
       eutra-SCG                            OCTET STRING
   }
}
-- TAG-RRCRECONFIGURATION-STOP
-- ASN1STOP
```

| RRCReconfiguration-IEs field descriptions |
| --- |
| conditionalReconfiguration |
| Configuration of conditional handover i.e., for each target candidate it contains a trigger condition associated to an RRCReconfiguration in an OCTET STRING to be applied upon the fulfilment of the condition. If the message also includes a reconfiguration with sync in CellGroupConfig (e.g. in masterCellGroup and/or secondaryCellGroup) the WD 22 performs the reconfiguration with sync and assumes that the conditionalReconfiguration as a target's configuration i.e. to be used in target. |
| dedicatedNAS-MessageList |
| This field is used to transfer WD specific NAS layer information between the network and the WD 22. The RRC layer is transparent for each PDU in the list. |
| dedicatedSIB1-Delivery |
| This field is used to transfer SIB1 to the WD 22. The field has the same values as the corresponding configuration in servingCellConfigCommon. |
| dedicatedSystemInformationDelivery |
| This field is used to transfer SIB6, SIB7, SIB8 to the WD 22. |
| fullConfig |
| Indicates that the full configuration option is applicable for the RRCReconfiguration message for intra-system intra-RAT HO. For inter-RAT HO from E-UTRA to NR, fullConfig indicates whether or not delta signalling of SDAP/PDCP from source RAT is applicable. |
| keySetChangeIndicator |
| Indicates whether WD 22 may derive a new KgNB. If reconfigurationWithSync is included, value true indicates that a KgNB key is derived from a KAMF key taken into use through the latest successful NAS SMC procedure, or N2 handover procedure with KAMF change, as described in 3GPP TS 33.501 for KgNB re-keying. Value false indicates that the new KgNB key is obtained from the current KgNB key or from the NH as described in TS 33.501. |
| masterCellGroup |
| Configuration of master cell group. |
| mrdc-ReleaseAndAdd |
| This field indicates that the current SCG configuration is released and a new SCG is added at the same time. |
| mrdc-SecondaryCellGroup |
| Includes an RRC message for SCG configuration in NR-DC or NE-DC. |
| For NR-DC (nr-SCG), mrdc-SecondaryCellGroup contains the RRCReconfiguration message as generated (entirely) by SN gNB. In this version of the specification, the RRC message can only include fields secondaryCellGroup and measConfig. |
| For NE-DC (eutra-SCG), mrdc-SecondaryCellGroup includes the E-UTRA RRCConnectionReconfiguration message as specified in TS 36.331. In this version of the specification, the E-UTRA RRC message can only include the field scg-Configuration. |
| nas-Container |
| This field is used to transfer WD specific NAS layer information between the network and the UE. The RRC layer is transparent for this field, although it affects activation of AS security after inter-system handover to NR. The content is defined in 3GPP TS 24.501. |
| nextHopChainingCount |
| Parameter NCC: See TS 33.501 |
| otherConfig |
| Contains configuration related to other configurations. |
| radioBearerConfig |
| Configuration of Radio Bearers (DRBs, SRBs) including SDAP/PDCP. In EN-DC this field may only be present if the RRCReconfiguration is transmitted over SRB3. |
| radioBearerConfig2 |
| Configuration of Radio Bearers (DRBs, SRBs) including SDAP/PDCP. This field can only be used if the UE supports NR-DC or NE-DC. |
| secondaryCellGroup |
| Configuration of secondary cell group ((NG)EN-DC or NR-DC). This field is absent when the RRCReconfiguration message is directly transmitted via MCG SRB1 and not within mrdc-secondaryCellGroup. |
| sk-Counter |
| A counter used upon initial configuration of S-KgNB or S-KeNB, as well as upon refresh of S-KgNB or S-KeNB. This field is always included upon initial configuration of an NR SCG or upon configuration of the first RB with keyToUse set to secondary. This field is absent if there is neither any NR SCG nor any RB with keyToUse set to secondary. |

-continued

| RRCReconfiguration-IEs field descriptions | |
|---|---|
| Conditional Presence | Explanation |
| nonHO | The field is absent in case of reconfiguration with sync within NR or to NR; otherwise it is optionally present, need N. |
| securityNASC | This field is mandatory present in case of inter system handover. Otherwise the field is optionally present, need N. |
| MasterKeyChange | This field is mandatory present in case masterCellGroup includes ReconfigurationWithSync and RadioBearerConfig includes SecurityConfig with SecurityAlgorithmConfig, indicating a change of the AS security algorithms associated to the master key. If ReconfigurationWithSync is included for other cases, this field is optionally present, need N. Otherwise the field is absent. |
| FullConfig | The field is mandatory present in case of inter-system handover from E-UTRA/EPC to NR. It is optionally present, Need N, during reconfiguration with sync and also in first reconfiguration after reestablishment; or for intra-system handover from E-UTRA/5GC to NR. It is absent otherwise. |

In an alternative or additional embodiment, only one of the two fields (e.g., conditional reconfiguration and reconfiguration with sync) can be included in the same message at time e.g., in the RRCReconfiguration. The benefit in this embodiment, at least compared to existing techniques, is that it avoids WD 22 misbehavior due to ambiguities that could exist if both configurations are included without further specification i.e., that includes the addition of a condition so that it is clear that the CHO cannot be signaled when HO/PSCell change/PScell addition is/are being signaled to the WD 22, i.e., when masterCellGroupConfig and/or secondaryCellGroupConfig include reconfiguration with sync. In other words, if both fields are included, the WD 22 does not apply the message and considers that it is not able to comply with it and perform actions upon e.g., re-establishment. An example of such alternative is shown below:

RRC Reconfiguration (Conditional Reconfiguration and Reconfiguration with Sync Prohibited in a Same RRC Reconfiguration Message)

One example of how that could be implemented in ASN.1 in the RRC specifications is shown below, where the possibility to signal only one of these: conditional reconfigurations (e.g., CHO configurations) and a mobility procedure request (e.g., a HO command), is considered.

The RRC Reconfiguration message is the command to modify an RRC connection. It may convey information for measurement configuration, mobility control, radio resource configuration (including RBs, MAC main configuration and physical channel configuration) and AS security configuration. It may also convey a conditional reconfiguration with a container with an RRCReconfiguration to only be applied upon the fulfilment of a trigger condition.

Signalling radio bearer: SRB1 or SRB3
RLC-SAP: AM
Logical channel: DCCH
Direction: Network node 16 to WD 22 (e.g., UE)

RRCReconfiguration Message

```
-- ASN1START
-- TAG-RRCRECONFIGURATION-START
RRCReconfiguration ::=                      SEQUENCE {
    rrc-TransactionIdentifier                   RRC-TransactionIdentifier,
    criticalExtensions                          CHOICE {
        rrcReconfiguration                          RRCReconfiguration-IEs,
        criticalExtensionsFuture                    SEQUENCE { }
    }
}
RRCReconfiguration-IEs ::=                  SEQUENCE {
    radioBearerConfig                           RadioBearerConfig
        OPTIONAL, -- Need M
    secondaryCellGroup                                  OCTET STRING (CONTAINING
CellGroupConfig)                                    OPTIONAL, -- Need M
    measConfig                                  MeasConfig
        OPTIONAL, -- Need M
    lateNonCriticalExtension                            OCTET STRING
        OPTIONAL,
    nonCriticalExtension                                RRCReconfiguration-v1530-IEs
        OPTIONAL
}
RRCReconfiguration-v1530-IEs ::=                    SEQUENCE {
    masterCellGroup                                     OCTET STRING (CONTAINING
CellGroupConfig)                                    OPTIONAL, -- Need M
    fullConfig                                  ENUMERATED {true}
        OPTIONAL, -- Cond FullConfig
    dedicatedNAS-MessageList                            SEQUENCE (SIZE(1..maxDRB)) OF
DedicatedNAS-Message                                OPTIONAL, -- Cond nonHO
```

-continued

| | |
|---|---|
| masterKeyUpdate | MasterKeyUpdate |
| OPTIONAL, -- Cond MasterKeyChange | |
| dedicatedSIB1-Delivery | OCTET STRING (CONTAINING SIB1) |
| OPTIONAL, -- Need N | |
| dedicatedSystemInformationDelivery | OCTET STRING (CONTAINING |
| SystemInformation) | OPTIONAL, -- Need N |
| otherConfig | OtherConfig |
| OPTIONAL, -- Need M | |
| nonCriticalExtension | RRCReconfiguration-v1540-IEs |
| OPTIONAL | |
| } | |
| RRCReconfiguration-v1540-IEs ::= | SEQUENCE { |
| otherConfig-v1540 | OtherConfig-v1540 |
| OPTIONAL, -- Need M | |
| nonCriticalExtension | RRCReconfiguration-v1560-IEs |
| OPTIONAL | |
| } | |
| RRCReconfiguration-v1560-IEs ::= | SEQUENCE { |
| mrdc-SecondaryCellGroupConfig | SetupRelease { MRDC- |
| SecondaryCellGroupConfig } | OPTIONAL, -- Need M |
| radioBearerConfig2 | OCTET STRING (CONTAINING |
| RadioBearerConfig) | OPTIONAL, -- Need M |
| sk-Counter | SK-Counter |
| OPTIONAL, -- Need N | |
| nonCriticalExtension | RRCReconfiguration-v16-IEs |
| OPTIONAL | |
| } | |
| RRCReconfiguration-v16-IEs ::= | SEQUENCE { |
| conditionalReconfiguration | ConditionalReconfiguration |
| | OPTIONAL, -- Cond nonHO-CHO |
| nonCriticalExtension | SEQUENCE { } OPTIONAL |
| } | |
| MasterKeyUpdate ::= | SEQUENCE { |
| keySetChangeIndicator | BOOLEAN, |
| nextHopChainingCount | NextHopChainingCount, |
| nas-Container | OCTET STRING |
| OPTIONAL, -- Cond securityNASC | |
| ... | |
| } | |
| MRDC-SecondaryCellGroupConfig ::= | SEQUENCE { |
| mrdc-ReleaseAndAdd | ENUMERATED {true} |
| OPTIONAL, -- Need N | |
| mrdc-SecondaryCellGroup | CHOICE { |
| nr-SCG | OCTET STRING (CONTAINING |
| RRCReconfiguration), | |
| eutra-SCG | OCTET STRING |
| } | |
| } | |
| -- TAG-RRCRECONFIGURATION-STOP | |
| -- ASN1STOP | |

| RRCReconfiguration-IEs field descriptions |
|---| conditionalReconfiguration
Configuration of conditional handover i.e., for each target candidate it contains a trigger
condition associated to an RRCReconfiguration in an OCTET STRING to be applied
upon the fulfilment of the condition. This is not configured in case the message carries a
reconfiguration with sync.
dedicatedNAS-MessageList
This field is used to transfer WD specific NAS layer information between the network and the
WD 22. The RRC layer is transparent for each PDU in the list.
dedicatedSIB1-Delivery
This field is used to transfer SIB1 to the WD 22. The field has the same values as the
corresponding configuration in servingCellConfigCommon.
dedicatedSystemInformationDelivery
This field is used to transfer SIB6, SIB7, SIB8 to the WD 22.
fullConfig
Indicates that the full configuration option is applicable for the RRCReconfiguration message
for intra-system intra-RAT HO. For inter-RAT HO from E-UTRA to NR, fullConfig indicates
whether or not delta signalling of SDAP/PDCP from source RAT is applicable.
keySetChangeIndicator
Indicates whether WD 22 may derive a new $K_{gNB}$. If reconfigurationWithSync is included,
value true indicates that a $K_{gNB}$ key is derived from a $K_{AMF}$ key taken into use through the
latest successful NAS SMC procedure, or N2 handover procedure with $K_{AMF}$ change, as
described in TS 33.501 for $K_{gNB}$ re-keying. Value false indicates that the new $K_{gNB}$ key is
obtained from the current $K_{gNB}$ key or from the NH as described in TS 33.501.

| RRCReconfiguration-IEs field descriptions |
| --- | masterCellGroup
Configuration of master cell group.
mrdc-ReleaseAndAdd
This field indicates that the current SCG configuration is released and a new SCG is added at
the same time.
mrdc-SecondaryCellGroup
Includes an RRC message for SCG configuration in NR-DC or NE-DC.
For NR-DC (nr-SCG), mrdc-SecondaryCellGroup contains the RRCReconfiguration message
as generated (entirely) by SN gNB. In this version of the specification, the RRC message can
only include fields secondaryCellGroup and measConfig.
For NE-DC (eutra-SCG), mrdc-SecondaryCellGroup includes the E-UTRA
RRCConnectionReconfiguration message as specified in TS 36.331. In this version of the
specification, the E-UTRA RRC message can only include the field scg-Configuration.
nas-Container
This field is used to transfer WD specific NAS layer information between the network and the
WD 22. The RRC layer is transparent for this field, although it affects activation of AS
security after inter-system handover to NR. The content is defined in TS 24.501.
nextHopChainingCount
Parameter NCC: See TS 33.501
otherConfig
Contains configuration related to other configurations.
radioBearerConfig
Configuration of Radio Bearers (DRBs, SRBs) including SDAP/PDCP. In EN-DC this field
may only be present if the RRCReconfiguration is transmitted over SRB3.
radioBearerConfig2
Configuration of Radio Bearers (DRBs, SRBs) including SDAP/PDCP. This field can only be
used if the WD 22 supports NR-DC or NE-DC.
secondaryCellGroup
Configuration of secondary cell group ((NG)EN-DC or NR-DC). This field is absent when the
RRCReconfiguration message is directly transmitted via MCG SRB1 and not within mrdc-
secondaryCellGroup.
sk-Counter
A counter used upon initial configuration of $S\text{-}K_{gNB}$ or $S\text{-}K_{eNB}$, as well as upon refresh of $S\text{-}K_{gNB}$ or $S\text{-}K_{eNB}$. This field is always included upon initial configuration of an NR SCG or upon
configuration of the first RB with keyToUse set to secondary. This field is absent if there is
neither any NR SCG nor any RB with keyToUse set to secondary.

| Conditional Presence | Explanation |
| --- | --- |
| nonHO | The field is absent in case of reconfiguration with sync within NR or to NR; otherwise it is optionally present, need N. |
| securityNASC | This field is mandatory present in case of inter system handover. Otherwise the field is optionally present, need N. |
| MasterKeyChange | This field is mandatory present in case masterCellGroup includes ReconfigurationWithSync and RadioBearerConfig includes SecurityConfig with SecurityAlgorithmConfig, indicating a change of the AS security algorithms associated to the master key. If ReconfigurationWithSync is included for other cases, this field is optionally present, need N. Otherwise the field is absent. |
| Cond nonHO-CHO | The field is absent in case of reconfiguration with sync within NR or to NR; otherwise it is optionally present, need M. |
| FullConfig | The field is mandatory present in case of inter-system handover from E-UTRA/EPC to NR. It is optionally present, Need N, during reconfiguration with sync and also in first reconfiguration after reestablishment; or for intra-system handover from E-UTRA/5GC to NR. It is absent otherwise. |

Having described arrangements for the WD 22 to receive the message above, in some embodiments, the method implemented in a WD 22 may include, upon receiving the message, one or more of:

WD 22 first executes the mobility procedure i.e., WD 22 accesses the target cell indicated in e.g., the HO command/reconfiguration with sync (instead of the conditional reconfiguration, e.g., CHO configuration, procedure); and/or Only after accessing the target cell does the WD 22 performs the conditional reconfiguration according to the configuration provided in the message, and start the actions upon conditional reconfiguration.

As an example, in the context of the disclosure, the following ASN.1 structure may be assumed for the conditional reconfiguration (e.g., CHO configuration) within the RRC Reconfiguration message, as shown in the previous step:

Conditional Reconfiguration

The IE ConditionalReconfiguration is used to add, modify or release a conditional handover configuration per target candidate cell.

ConditionalReconfiguration Information Element

```
-- ASN1START
-- TAG-CONDITIONAL-RECONFIG-START
```

-continued

```
ConditionalReconfiguration ::=        SEQUENCE {
    condReconfigurationToRemoveList
    CondReconfigurationToRemoveList
        OPTIONAL,   -- Need N
    condReconfigurationToAddModList
    CondReconfigurationToAddModList
        OPTIONAL,   -- Need N
    ...
}
CondReconfigurationToRemoveList ::=    SEQUENCE (SIZE
(1..maxNrofCondReconf)) OF CondReconfigurationId
-- TAG-CONDITIONAL-RECONFIG-STOP
-- ASN1STOP
```

| ConditionalReconfiguration field descriptions |
|---|
| condReconfigurationToAddModList  List of conditional reconfigurations to add and/or modify.  condReconfigurationToRemoveList  List of conditional reconfigurations to remove. |

ConditionalReconfigurationId

The IE ConditionalReconfigurationId is used to identify a conditional reconfiguration i.e., linking of trigger conditions and an RRCReconfiguration to be applied upon the fulfilment of the conditions.

ConditionalReconfigurationId Information Element

```
-- ASN1START
-- TAG-CONDRECONFIGURATIONID-START
CondReconfigurationId ::=              INTEGER (1..maxNrofCondReconf)
-- TAG-CONDRECONFIGURATIONID-STOP
-- ASN1STOP
    CondReconfigurationToAddModList
    The IE CondReconfigurationToAddModList concerns a list of conditional
handover configurations to add or modify, with for each entry the measId (associated
to the triggering condition configuration) and the associated RRCReconfiguration.
        CondReconfigurationToAddModList information element
-- ASN1START
-- TAG-CONDRECONFIGURATIONTOADDMODLIST-START
CondReconfigurationToAddModList ::=        SEQUENCE (SIZE (1..
maxNrofCondReconf)) OF CondReconfigurationAddMod
CondReconfigurationAddMod ::=              SEQUENCE {
    condReconfigurationId                  CondReconfigurationId,
    condReconfigurationPerTargetCandidate
    CondReconfigurationPerTargetCandidate
    ...
}
-- TAG-CONDRECONFIGURATIONTOADDMODLIST-START
-- ASN1STOP
```

CondReconfigurationPerTargetCandidate

The IE CondReconfigurationPerTargetCandidate contains a conditional reconfiguration for a target candidate cell including a trigger condition configuration which is a set of pointers to measurement identifiers, each measId with its trigger condition, and an associated RRCReconfiguration in an OCTET STRING to be applied when all conditions associated to the measurement identifiers are fulfilled.

CondReconfigurationPerTargetCandidate Information Element

```
-- ASN1START
-- TAG-CONDRECONFIGURATIONPERTARGETCANDIDATE-START
CondReconfigurationPerTargetCandidate ::=     SEQUENCE {
    rrcReconfigurationToApply                 OCTET STRING
(CONTAINING RRCReconfiguration)
    triggerCondition                          MeasId,
    ...
}
-- TAG- CONDRECONFIGURATIONPERTARGETCANDIDATE-STOP
-- ASN1STOP
```

Note: For further study (FFS): whether the triggerCondition may refer to a list of measurement identifiers e.g. SEQUENCE (SIZE (1 . . . K)) OF MeasId.

Then, in some embodiments, these previous steps could be modeled in the RRC specifications by moving the conditional reconfigurations (e.g., CHO configurations) to after the execution of a possibly received HO command. Thus, it becomes clear that conditional reconfigurations (e.g., CHO configurations) are associated to (e.g., prepared by) the target cell for which the WD 22 is performing the handover, as shown below (note particularly the bolded sections below).

5.3.5.3 Reception of an RRCReconfiguration by the WD 22

The WD 22 may perform the following actions upon reception of the RRCReconfiguration or upon applying a stored RRCReconfiguration message upon conditional reconfiguration execution:

1>if the RRCReconfiguration is received via other RAT (i.e., inter-RAT handover to NR):
   2>if the RRCReconfiguration does not include the fullConfig and the WD 22 is connected to 5GC (i.e., delta signalling during intra 5GC handover):
      3>re-use the source RAT SDAP and PDCP configurations if available (i.e., current SDAP/PDCP configurations for all RBs from source E-UTRA RAT prior to the reception of the inter-RAT HO RRCReconfiguration message);
1>else:
   2>if the RRCReconfiguration includes the fullConfig:
      3>perform the full configuration procedure as specified in 5.3.5.11;
1>if the RRCReconfiguration includes the masterCellGroup:
   2>perform the cell group configuration for the received masterCellGroup according to 5.3.5.5;
1>if the RRCReconfiguration includes the masterKeyUpdate:
   2>perform AS security key update procedure as specified in 5.3.5.7;
1>if the RRCReconfiguration includes the sk-Counter:
   2>perform security key update procedure as specified in 5.3.5.7;
1>if the RRCReconfiguration includes the secondaryCellGroup:
   2>perform the cell group configuration for the SCG according to 5.3.5.5;
1>if the RRCReconfiguration includes the mrdc-SecondaryCellGroupConfig:
   2>if the mrdc-SecondaryCellGroupConfig is set to setup:
      3>if the mrdc-SecondaryCellGroupConfig includes mrdc-ReleaseAndAdd:
         4>perform MR-DC release as specified in section 5.3.5.10;
      3>if the received mrdc-SecondaryCellGroup is set to nr-SCG:
         4>perform the RRC reconfiguration according to 5.3.5.3 for the RRCReconfiguration message included in nr-SCG;
      3>if the received mrdc-SecondaryCellGroup is set to eutra-SCG:
         4>perform the RRC connection reconfiguration as specified in TS 36.331, clause 5.3.5.3 for the RRCConnectionReconfiguration message included in eutra-SCG;
   2>else (mrdc-SecondaryCellGroupConfig is set to release):
      3>perform MR-DC release as specified in section 5.3.5.10;
1>if the RRCReconfiguration message includes the radioBearerConfig:
   2>perform the radio bearer configuration according to 5.3.5.6;
1>if the RRCReconfiguration message includes the radioBearerConfig2:
   2>perform the radio bearer configuration according to 5.3.5.6;
1>if the RRCReconfiguration message includes the measConfig:
   2>perform the measurement configuration procedure as specified in 5.5.2;
1>if the RRCReconfiguration message includes the dedicatedNAS-MessageList:
   2>forward each element of the dedicatedNAS-MessageList to upper layers in the same order as listed;
1>if the RRCReconfiguration message includes the dedicatedSIB1-Delivery:
   2>perform the action upon reception of SIB1 as specified in 5.2.2.4.2;
1>if the RRCReconfiguration message includes the dedicatedSystemInformationDelivery:
   2>perform the action upon reception of System Information as specified in 5.2.2.4;
1>if the RRCReconfiguration message includes the otherConfig:
   2>perform the other configuration procedure as specified in 5.3.5.9;
1>if the RRCReconfiguration message includes the conditionalReconfiguration:
   2>perform conditional reconfiguration as specified in 5.3.5.x;

Note: FFS Confirm the usage of an enhanced version of the RRCReconfiguration message to configure conditional handover.

1>set the content of RRCReconfigurationComplete message as follows:

Note: FFS Whether to provide an exception to the transmission of the RRCReconfigurationComplete message i.e. not transmit if only conditional reconfiguration is included in the message.

Note: FFS Whether to provide an exception to the transmission of the RRCReconfigurationComplete message i.e. not transmit in case the message contains CHO configuration and upon reception a trigger condition is fulfilled.

2>if the RRCReconfiguration includes the masterCellGroup containing the reportUplinkTxDirectCurrent; or
   2>if the RRCReconfiguration includes the secondaryCellGroup containing the reportUplinkTxDirectCurrent:
      3>include the uplinkTxDirectCurrentList for each serving cell with UL;
      3>if WD 22 is configured with SUL carrier:
         4>include uplinkDirectCurrentBWP-SUL for each serving cell with SUL within the uplinkTxDirectCurrentList;
   2>if the received RRCReconfiguration message includes the mrdc-SecondaryCellGroupConfig with mrdc-SecondaryCellGroup set to eutra-SCG:
      3>include eutra-SCG-Response within scg-Response in accordance with TS 36.331 clause 5.3.5.3;

2>if the received RRCReconfiguration message includes the mrdc-SecondaryCellGroupConfig with mrdc-SecondaryCellGroup set to nr-SCG:
 3>include nr-SCG-Response within scg-Response;
1>if the WD 22 is configured with E-UTRA nr-SecondaryCellGroupConfig (MCG is E-UTRA):
 2>ifRRCReconfiguration was received via SRB1:
  3>submit the RRCReconfigurationComplete via the E-UTRA MCG embedded in E-UTRA RRC message RRCConnectionReconfigurationComplete as specified in TS 36.331;
  3>if reconfigurationWithSync was included in spCellConfig of an SCG:
   4>initiate the Random Access procedure on the SpCell, as specified in TS 38.321;
  3>else:
   4>the procedure ends;
NOTE 1: The order the WD 22 sends the RRCConnectionReconfigurationComplete message and performs the Random Access procedure towards the SCG is left to WD implementation.
 2>else (RRCReconfiguration was received via SRB3):
  3>submit the RRCReconfigurationComplete message via SRB3 to lower layers for transmission using the new configuration;
NOTE 2: In (NG)EN-DC and NR-DC, in the case RRCReconfiguration is received via SRB1, the random access is triggered by RRC layer itself as there is not necessarily other UL transmission. In the case RRCReconfiguration is received via SRB3, the random access is triggered by the MAC layer due to arrival of RRCReconfigurationComplete.
1>else if RRCReconfiguration message was received within the nr-SCG within mrdc-SecondaryCellGroup (NR SCG RRC Reconfiguration):
 2>if reconfigurationWithSync was included in spCellConfig in nr-SCG:
  3>initiate the Random Access procedure on the PSCell, as specified in TS 38.321;
 2>else
  3>the procedure ends;
1>else if RRCReconfiguration was received via SRB3:
 2>submit the RRCReconfigurationComplete message via SRB3 to lower layers for transmission using the new configuration;
1>else (MCG RRCReconfiguration):
 2>submit the RRCReconfigurationComplete message via SRB1 to lower layers for transmission using the new configuration;
 2>if this is the first RRCReconfiguration message after successful completion of the RRC re-establishment procedure:
  3>resume SRB2 and DRBs that are suspended;
1>if reconfigurationWithSync was included in spCellConfig of an MCG or SCG, and when MAC of an NR cell group successfully completes a Random Access procedure triggered above;
 2>stop timer T304 for that cell group;
 2>apply the parts of the CQI reporting configuration, the scheduling request configuration and the sounding RS configuration that do not require the WD 22 to know the SFN of the respective target SpCell, if any;
 2>apply the parts of the measurement and the radio resource configuration that require the WD 22 to know the SFN of the respective target SpCell (e.g. measurement gaps, periodic CQI reporting, scheduling request configuration, sounding RS configuration), if any, upon acquiring the SFN of that target SpCell;
 2>if the reconfigurationWithSync was included in spCellConfig of an MCG:
  3>if T390 is running:
   4>stop timer T390 for all access categories;
   4>perform the actions as specified in 5.3.14.4.
  3>ifRRCReconfiguration does not include dedicatedSIB1-Delivery and
  3>if the active downlink BWP, which is indicated by the firstActiveDownlinkBWP-Id for the target SpCell of the MCG, has a common search space configured by searchSpaceSIB1:
   4>acquire the SIB1, which is scheduled as specified in TS 38.213, of the target SpCell of the MCG;
   4>upon acquiring SIB1, perform the actions specified in clause 5.2.2.4.2;
 2>remove all the entries within VarConditionalReconfiguration, if any;
Note: FFS Whether we need to specify any WD autonomous actions regarding VarMeasConfig associated to conditional handover.
Note: FFS Confirm the use of a WD variable to handle CHO configurations e.g. VarConditionalReconfiguration.
 2>the procedure ends.
NOTE 3: The WD 22 is only required to acquire broadcasted SIB1 if the WD 22 can acquire it without disrupting unicast data reception, i.e. the broadcast and unicast beams are quasi co-located.
5.3.5.x Conditional Reconfiguration
5.3.5.x.1 General In some embodiments, the network node 16 configures the WD 22 with conditional reconfiguration including per target cell candidate an RRCReconfiguration to only be applied upon the fulfilment of an associated trigger condition configuration. The network node 16 provides the configuration parameters in the ConditionalReconfiguration IE.

In some embodiments, the WD 22 performs one or more of the following actions based on a received ConditionalReconfiguration IE:
1>if the received condReconfiguration includes the condReconfigurationToRemoveList:
 2>perform the conditional reconfiguration removal procedure as specified in 5.3.5.x.2;
1>if the received condReconfiguration includes the condReconfigurationToAddModList:
 2>perform the conditional reconfiguration removal addition/modification procedure as specified in 5.3.5.x.3.
5.3.5.x.2 Conditional Reconfiguration Removal
The WD 22 may:
1>for each condReconfigurationId included in the received condReconfigurationToRemoveList that is part of the current WD 22 configuration in VarConditionalReconfiguration:
 2>stop the monitoring of triggering conditions linked by the measurement identities;
 2>remove the entry with the matching condReconfigurationId from the condReconfigurationList within the VarConditionalReconfiguration;
NOTE: The WD 22 does not consider the message as erroneous if the condReconfigurationToRemoveList includes any condReconfigurationId value that is not part of the current WD 22 configuration.

Note: FFS Whether to define any WD autonomous removal of measurement configurations upon the removal of a CHO configuration.

5.3.5.x.3 Conditional Reconfiguration Addition/Modification

The WD 22 may:
1>for each condReconfigurationId included in the received condReconfigurationToAddModList:
  2>if an entry with the matching condReconfigurationId exists in the condReconfigurationList within the VarConditionalReconfiguration:
    3>stop the monitoring of triggering conditions linked by the measurement identities;
    3>replace the entry with the values received for this condReconfigurationId;
  Note: FFS Confirm that the RRCReconfiguration is also replaced, and handling if that is absent.
  2>else:
    3>add a new entry for this condReconfigurationId within the VarConditionalReconfiguration;
    3>store the associated RRCReconfiguration in VarConditionalReconfiguration;
  2>monitor the triggering conditions associated to the measurement identities of that condReconfigurationId, as specified in 5.5.4

5.3.5.x.4 Conditional Reconfiguration Execution

For the measId for which the trigger condition for conditional reconfiguration was fulfilled, the WD 22 may:
1>for each condReconfigurationId within the VarConditionalReconfiguration that has that measId associated to its stored RRCReconfiguration:
  2>if all trigger conditions are fulfilled for that condReconfigurationId:
    3>consider the target cell candidate within the stored RRCReconfiguration, associated to that condReconfigurationId, as a triggered cell;
1>if there are more than one triggered cell:
  2>FFS;
Note: FFS Cell selection in case multiple cells fulfil the triggering conditions for conditional reconfiguration.
1>else:
  2>consider that cell as the selected cell for conditional reconfiguration;
1>upon selecting one target candidate cell for conditional reconfiguration:
  2>if the WD 22 is able to comply with the stored RRCReconfiguration for the selected cell:
    3>apply the stored RRCReconfiguration as specified in 5.3.5.3;
  2>else:
    3>perform the reconfiguration failure procedure, as specified in 5.3.5.8;
Note: FFS Whether the compliance of the target candidates RRCReconfiguration is performed upon reception of the conditional reconfiguration(s).

Figure 12:
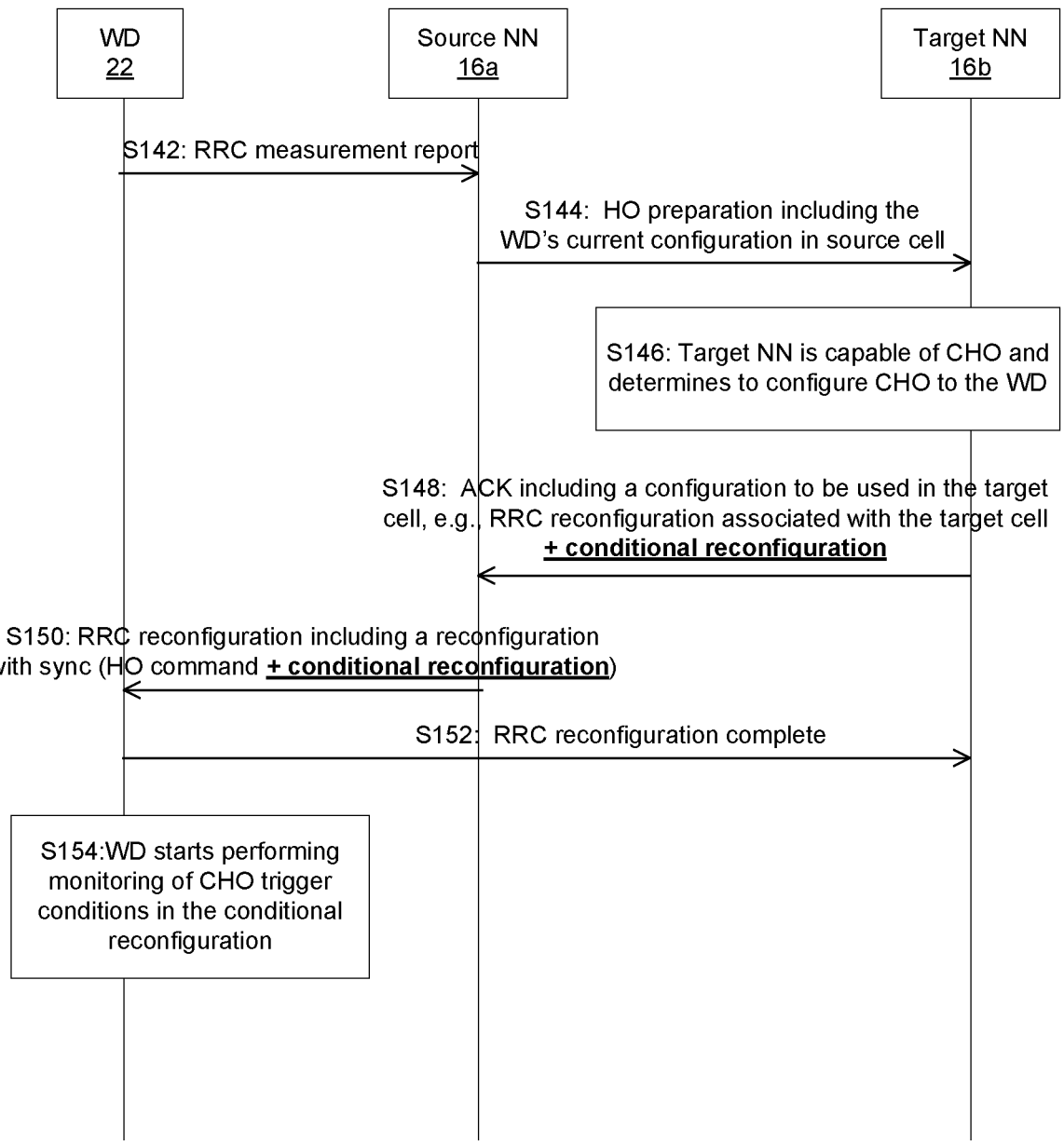
FIG. 12 is a flowchart of an example handover process according to some embodiments of the present disclosure.

In some embodiments, a signaling flow focusing on the WD 22 aspects is shown, for example, in FIG. 12. Although the example is described in terms of a HO procedure, the principles may also be applicable to other types of mobility procedures.

FIG. 12 shows the WD 22 transmitting an RRC measurement report to the source network node 16*a* in step S142. The source network node 16*a* may then transmit a request to perform a mobility procedure for the WD 22, such as by transmitting a HO preparation message including the current WD's 22 configuration information to the target network node 16*b* in step S144. The target network node 16*b* is capable of CHO and may determine to configure that to the WD 22 in step S146. The target network node 16*b* may then send an acknowledgement (ACK) message to the source network node 16*a* in step S148. The ACK message may include a configuration e.g., RRC reconfiguration to be used in a target cell supported by the target network node 16*b*, as well as, the conditional reconfigurations (e.g., CHO configurations) e.g., associated with a target candidate cell corresponding to/prepared by the target network node 16*b*. The source network node 16*a* may transmit the RRC reconfiguration to the WD 22 in step S150. The RRC reconfiguration may include an indication to perform the mobility procedure (e.g., reconfiguration with synch) as well as the conditional reconfiguration. In some embodiments, the reconfiguration with synch may be considered a HO command and the CHO configuration may be comprised in the conditional reconfiguration. The WD 22 may then transmit an RRC reconfiguration complete message to the target network node 16*b* in step S152. The WD 22 may begin performing at least one action according to the conditional reconfiguration, such monitoring of CHO trigger conditions in step S154, as shown for example in FIG. 12.

In some embodiments, the disclosure provides for a method performed by a target network node 16*b* (also called a source gNodeB) for reconfiguration procedure including conditional reconfigurations (e.g., CHO configurations), the method including one or more of the following:

Receiving from a source node 16*a* (e.g., in a handover preparation procedure) the WD's 22 current configuration (i.e., configuration being used in a source cell supported by the source network node 16*a*) in a handover/reconfiguration with sync/PSCell change request message; the request message may include measurements performed and reported by the WD 22 e.g. in the inter-node RRM container;

Determining to prepare a conditional reconfiguration for the WD 22, such as by configuring CHO for that incoming WD 22; hence, including CHO configurations in the WD's 22 target configuration according to the target network node 16*b*, to be provided to the WD 22 by the source network node 16*a*; the conditional reconfiguration (e.g., associated with a target candidate cell) and the WD's 22 target configuration (e.g., RRC reconfiguration to be used by the WD 22 after accessing the target cell supported by the target network node 16*b*) included in an RRC container from target network node 16*b* to source network node 16*a* in the HO preparation procedure;

That decision to include the conditional reconfigurations by target network node 16*b* may possibly be determined based on measurements from the WD 22 included in the inter-node message from the source network node 16*a* in the HO request, as described above.

If target candidate cells associated with the conditional reconfigurations to be given to the WD 22 are not supported by the same target network node 16*b* (e.g., cells supported by other neighbor network nodes), the target network node 16*b* may initiate a CHO preparation procedure (which may be a HO preparation procedure with an indication that this is for CHO) with target candidate network nodes by sending a target WD 22 configuration i.e., the WD 22 configuration that is going to be used in the target cell after the WD 22 accesses it. For that purpose, the target network node 16*b* may create a WD's 22 full configuration, based on the WD's 22 current configuration in the source cell and what the target network node (e.g., network node 16b) wants to modify, so that each target candidate network node understands what kind of reconfiguration may be used to prepare for these conditional reconfigurations. In another alternative, only full-configuration is allowed to be prepared by target candidate network nodes associated to a target candidate cell in HO.

Transmitting to the source node (e.g., network node 16a) (e.g. in a handover preparation procedure, ACK) the WD's 22 configuration (e.g. container with an RRC reconfiguration containing a reconfiguration with sync and conditional reconfiguration) to be used in the target upon handover execution, including CHO configurations. Each conditional reconfiguration is per target candidate cell and includes a trigger condition configuration (which may be one or multiple measurement identities associated to measurement configuration) and a target candidate cell configuration (which may be an RRC reconfiguration, either full-config or delta configuration having as baseline the WD's 22 target configuration to be used after the WD 22 accesses the target cell).

Receiving an RRC reconfiguration complete message from that incoming WD 22 (where WD 22 uses the WD's 22 target configuration) and understanding that the incoming WD 22 is performing actions according to the provided conditional reconfiguration such as the monitoring of triggering conditions that have been configured.

Figure 13:
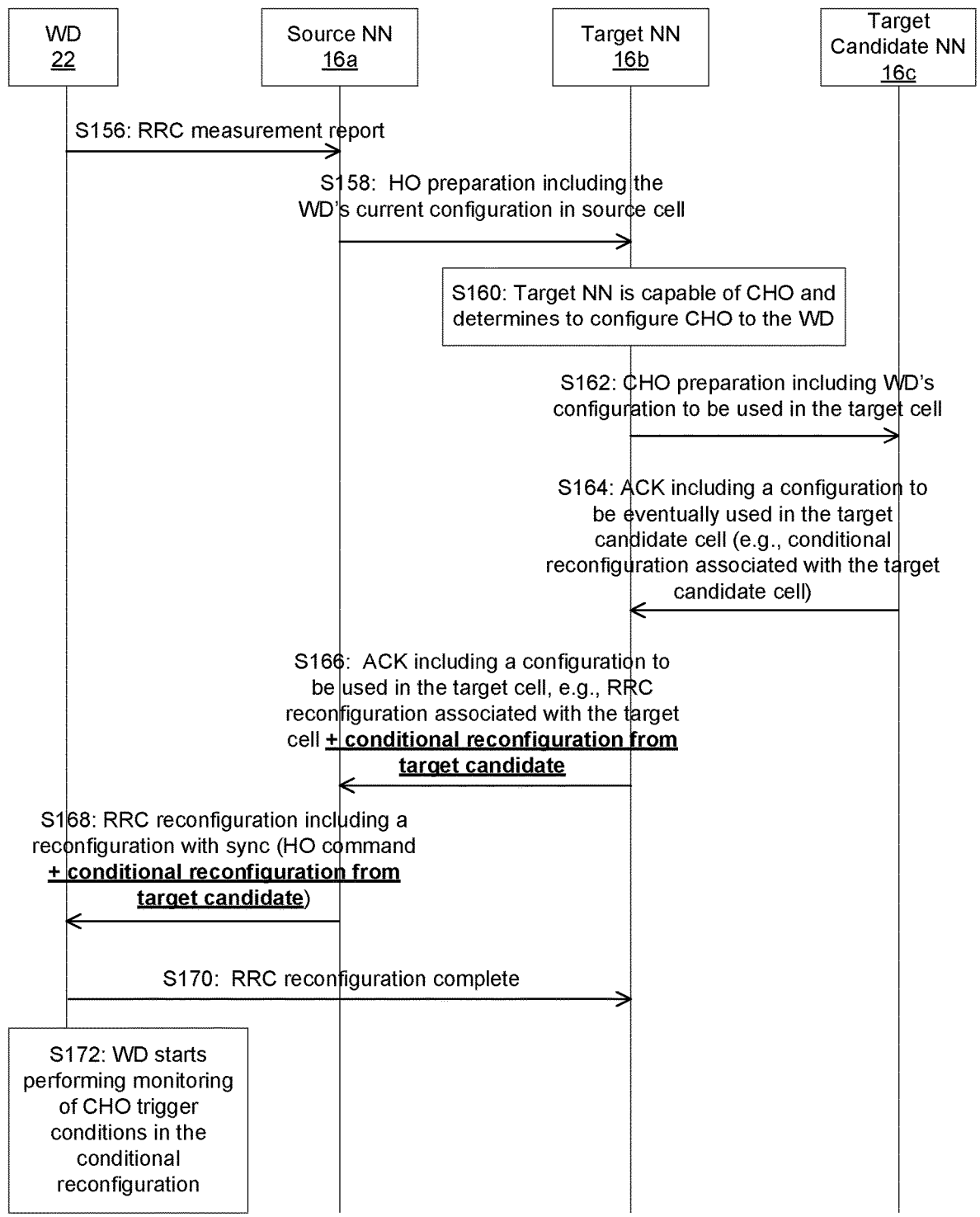
FIG. 13 is a flowchart of yet another example handover process according to some embodiments of the present disclosure.

In some embodiments, a signaling flow focusing on an example of the network node 16 aspects (signaling between source NN 16a, target NN 16b and target candidate NN 16c for CHO) is shown in FIG. 13, as an example. FIG. 13 shows the WD 22 transmitting an RRC measurement report to the source network node 16a in step S156. The source network node 16a then transmits an HO preparation message including the current WD's 22 configuration information to the target network node 16b in step S158. The target network node 16b is capable of CHO and may determine to prepare a conditional reconfiguration for the WD 22, e.g., configure CHO to the WD 22 in step S160. The target network node 16b may transmit a CHO preparation message to a target candidate network node 16c in step S162. The CHO preparation may include the WD's 22 configuration to be used in the target cell. In step S164, the target candidate network node 16c may send an ACK including a configuration to be eventually used in the target candidate cell, e.g., CHO configurations associated with the target candidate cell.

In step S166, the target network node 16b may then send an acknowledgement (ACK) message to the source network node 16a. The ACK message may include a configuration to be used in the target cell, e.g., RRC reconfiguration, in addition to the conditional reconfiguration associated with the target candidate cell from the target candidate network node 16c. In step S168, the source network node 16a may transmit the RRC reconfiguration to the WD 22. The RRC reconfiguration may include a reconfiguration with synch (HO command) as well as the conditional reconfiguration from the target candidate network node 16c. In step S170, the WD 22 may then transmit an RRC reconfiguration complete message to the target network node 16b. In step S172, the WD 22 may begin performing the monitoring of CHO trigger conditions as shown for example in FIG. 13.

Generally, in a case where the handover (reconfiguration with synch) fails a re-establishment will occur. It is a working assumption in RAN2 that in case of re-establishment and the WD 22 chooses a cell which has CHO configured, the WD 22 is allowed to perform a handover to that cell instead of a re-establishment. In this disclosure, the WD 22 will possibly be configured both with CHO target cells from the source network node (e.g., network node 16a) and CHO target cells from the target network node (e.g., network node 16b). Some embodiments of the disclosure describe which cells (e.g., candidate cells) the WD 22 is allowed to perform handover to. That could be performed either in procedure text, or as an explicit indication where it is indicated that the WD 22 is allowed to use the CHO target cells from the source network node 16a, or the CHO target cells from the target network node 16b or both. See below an example of implementation in a procedure text in TS 38.331 marked with bold and underline in the section below:

5.3.5.5 Reception of an RRCReconfiguration by the WD 22

The WD 22 (e.g., UE) may perform the following actions upon reception of the RRCReconfiguration or upon applying a stored RRCReconfiguration message upon conditional reconfiguration execution:

1>if the RRCReconfiguration is received via other RAT (i.e., inter-RAT handover to NR):
   2>if the RRCReconfiguration does not include the fullConfig and the WD 22 is connected to 5GC (i.e., delta signalling during intra 5GC handover):
      3>re-use the source RAT SDAP and PDCP configurations if available (i.e., current SDAP/PDCP configurations for all RBs from source E-UTRA RAT prior to the reception of the inter-RAT HO RRCReconfiguration message);

1>else:
   2>if the RRCReconfiguration includes the fullConfig:
      3>perform the full configuration procedure as specified in 5.3.5.11;

1>if the RRCReconfiguration includes the masterCellGroup:
   2>perform the cell group configuration for the received masterCellGroup according to 5.3.5.5;

1>if the RRCReconfiguration includes the masterKeyUpdate:
   2>perform AS security key update procedure as specified in 5.3.5.7;

1>if the RRCReconfiguration includes the sk-Counter:
   2>perform security key update procedure as specified in 5.3.5.7;

1>if the RRCReconfiguration includes the secondaryCellGroup:
   2>perform the cell group configuration for the SCG according to 5.3.5.5;

1>if the RRCReconfiguration includes the mrdc-SecondaryCellGroupConfig:
   2>if the mrdc-SecondaryCellGroupConfig is set to setup:
      3>if the mrdc-SecondaryCellGroupConfig includes mrdc-ReleaseAndAdd:
         4>perform MR-DC release as specified in section 5.3.5.10;
      3>if the received mrdc-SecondaryCellGroup is set to nr-SCG:
         4>perform the RRC reconfiguration according to 5.3.5.3 for the RRCReconfiguration message included in nr-SCG;

3>if the received mrdc-SecondaryCellGroup is set to eutra-SCG:
    4>perform the RRC connection reconfiguration as specified in TS 36.331, clause 5.3.5.3 for the RRCConnectionReconfiguration message included in eutra-SCG;
2>else (mrdc-SecondaryCellGroupConfig is set to release):
    3>perform MR-DC release as specified in section 5.3.5.10;
1>if the RRCReconfiguration message includes the radioBearerConfig:
    2>perform the radio bearer configuration according to 5.3.5.6;
1>if the RRCReconfiguration message includes the radioBearerConfig2:
    2>perform the radio bearer configuration according to 5.3.5.6;
1>if the RRCReconfiguration message includes the measConfig:
    2>perform the measurement configuration procedure as specified in 5.5.2;
1>if the RRCReconfiguration message includes the dedicatedNAS-MessageList:
    2>forward each element of the dedicatedNAS-MessageList to upper layers in the same order as listed;
1>if the RRCReconfiguration message includes the dedicatedSIB1-Delivery:
    2>perform the action upon reception of SIB1 as specified in 5.2.2.4.2;
1>if the RRCReconfiguration message includes the dedicatedSystemInformationDelivery:
    2>perform the action upon reception of System Information as specified in 5.2.2.4;
1>if the RRCReconfiguration message includes the otherConfig:
    2>perform the other configuration procedure as specified in 5.3.5.9;
1>if the RRCReconfiguration message includes the conditionalReconfiguration:
    2>perform conditional reconfiguration as specified in 5.3.5.x;
Note: FFS Confirm the usage of an enhanced version of the RRCReconfiguration message to configure conditional handover.
NOTE: If the RRCReconfigguration message includes both reconfiggurationwithSvnc and conditionalReconfigguration, the WD 22 may consider all conditional handover target cells in case of failure in the reconfiggurationwithSvnc procedure.
1>set the content of RRCReconfigurationComplete message as follows:
Note: FFS Whether we need an exception to the transmission of the RRCReconfigurationComplete message i.e. not transmit if only conditional reconfiguration is included in the message.
Note: FFS Whether we need an exception to the transmission of the RRCReconfigurationComplete message i.e. not transmit in case the message contains CHO configuration and upon reception a trigger condition is fulfilled.
    2>if the RRCReconfiguration includes the masterCellGroup containing the reportUplinkTxDirectCurrent; or
    2>if the RRCReconfiguration includes the secondaryCellGroup containing the reportUplinkTxDirectCurrent:
        3>include the uplinkTxDirectCurrentList for each serving cell with UL;
        3>if WD 22 is configured with SUL carrier:
            4>include uplinkDirectCurrentBWP-SUL for each serving cell with SUL within the uplinkTxDirectCurrentList;
    2>if the received RRCReconfiguration message includes the mrdc-SecondaryCellGroupConfig with mrdc-SecondaryCellGroup set to eutra-SCG:
        3>include eutra-SCG-Response within scg-Response in accordance with TS 36.331 clause 5.3.5.3;
    2>if the received RRCReconfiguration message includes the mrdc-SecondaryCellGroupConfig with mrdc-SecondaryCellGroup set to nr-SCG:
        3>include nr-SCG-Response within scg-Response;
1>if the WD 22 is configured with E-UTRA nr-SecondaryCellGroupConfig (MCG is E-UTRA):
    2>if RRCReconfiguration was received via SRB1:
        3>submit the RRCReconfigurationComplete via the E-UTRA MCG embedded in E-UTRA RRC message RRCConnectionReconfigurationComplete as specified in TS 36.331;
        3>if reconfigurationWithSync was included in spCellConfig of an SCG:
            4>initiate the Random Access procedure on the SpCell, as specified in TS 38.321;
        3>else:
            4>the procedure ends;
NOTE 1: The order the WD 22 sends the RRCConnectionReconfigurationComplete message and performs the Random Access procedure towards the SCG is left to WD 22 implementation.
    2>else (RRCReconfiguration was received via SRB3):
        3>submit the RRCReconfigurationComplete message via SRB3 to lower layers for transmission using the new configuration;
NOTE 2: In (NG)EN-DC and NR-DC, in the case RRCReconfiguration is received via SRB1, the random access is triggered by RRC layer itself as there is not necessarily other UL transmission. In the case RRCReconfiguration is received via SRB3, the random access is triggered by the MAC layer due to arrival of RRCReconfigurationComplete.
1>else if RRCReconfiguration message was received within the nr-SCG within mrdc-SecondaryCellGroup (NR SCG RRC Reconfiguration):
    2>if reconfigurationWithSync was included in spCellConfig in nr-SCG:
        3>initiate the Random Access procedure on the PSCell, as specified in TS 38.321;
    2>else
        3>the procedure ends;
1>else if RRCReconfiguration was received via SRB3:
    2>submit the RRCReconfigurationComplete message via SRB3 to lower layers for transmission using the new configuration;
1>else (MCG RRCReconfiguration):
    2>submit the RRCReconfigurationComplete message via SRB1 to lower layers for transmission using the new configuration;
    2>if this is the first RRCReconfiguration message after successful completion of the RRC re-establishment procedure:

3>resume SRB2 and DRBs that are suspended;
1>if reconfigurationWithSync was included in spCellConfig of an MCG or SCG, and when MAC of an NR cell group successfully completes a Random Access procedure triggered above;
2>stop timer T304 for that cell group;
2>apply the parts of the CQI reporting configuration, the scheduling request configuration and the sounding RS configuration that do not require the WD 22 to know the SFN of the respective target SpCell, if any;
2>apply the parts of the measurement and the radio resource configuration that require the WD 22 to know the SFN of the respective target SpCell (e.g. measurement gaps, periodic CQI reporting, scheduling request configuration, sounding RS configuration), if any, upon acquiring the SFN of that target SpCell;
2>if the reconfigurationWithSync was included in spCellConfig of an MCG:
3>if T390 is running:
4>stop timer T390 for all access categories;
4>perform the actions as specified in 5.3.14.4.
3>ifRRCReconfiguration does not include dedicatedSIB1-Delivery and
3>if the active downlink BWP, which is indicated by the firstActiveDownlinkBWP-Id for the target SpCell of the MCG, has a common search space configured by searchSpaceSIB1:
4>acquire the SIB1, which is scheduled as specified in TS 38.213, of the target SpCell of the MCG;
4>upon acquiring SIB1, perform the actions specified in clause 5.2.2.4.2;
2>remove all the entries within VarConditionalReconfiguration, if any;
Note: FFS Whether we need to specify any WD autonomous actions regarding VarMeasConfig associated to conditional handover.
Note: FFS Confirm the use of a WD variable to handle CHO configurations e.g. VarConditionalReconfiguration.
2>the procedure ends.
NOTE 3: The WD 22 may only be required to acquire broadcasted SIB1 if the WD 22 can acquire it without disrupting unicast data reception, i.e., the broadcast and unicast beams are quasi co-located.

In addition, some embodiments may include one or more of the following:

Embodiment A1. A network node configured to communicate with a wireless device (WD), the network node configured to, and/or comprising a radio interface and/or comprising processing circuitry configured to one or more of:
receive a handover (HO) preparation message from a source network node in a HO procedure, the HO preparation message including a current configuration of the WD in a source cell;
determine to configure a conditional handover (CHO) for the WD; and
transmit a message to the source network node, the message including the determined CHO configuration.

Embodiment A2. The network node of Embodiment A1, wherein the network node and/or the radio interface and/or the processing circuitry is further configured to:
receive a radio resource control (RRC) reconfiguration complete message from the WD; and
as a result of the received RRC reconfiguration complete message, communicate with the WD based on an assumption that the WD is operating according to the CHO configuration.

Embodiment B1. A method implemented in a network node, the method comprising one or more of:
receiving a handover (HO) preparation message from a source network node in a HO procedure, the HO preparation message including a current configuration of the WD in a source cell;
determining to configure a conditional handover (CHO) for the WD; and
transmitting a message to the source network node, the message including the determined CHO configuration.

Embodiment B2. The method of Embodiment B1, further comprising: receiving a radio resource control (RRC) reconfiguration complete message from the WD; and
as a result of the received RRC reconfiguration complete message, communicating with the WD based on an assumption that the WD is operating according to the CHO configuration.

Embodiment C1. A wireless device (WD) configured to communicate with a network node, the WD configured to, and/or comprising a radio interface and/or processing circuitry configured to one or more of:
receive a message, the message being a radio resource control (RRC) reconfiguration message that includes a conditional handover (CHO) configuration and an indication of a handover (HO) command, the CHO prepared by a target network node and the HO command prepared by a source network node;
responsive to the received message, attempt to access the target network node indicated in the HO command; and/or
as a result of accessing the target network node, perform the CHO according to the CHO configuration in the received message.

Embodiment C2. The WD of Embodiment C1, wherein the WD and/or the radio interface and/or the processing circuitry is further configured to:
responsive to a HO failure while attempting to access the target network node, select a candidate cell indicated in the CHO configuration and perform a handover of the WD to the selected candidate cell.

Embodiment D1. A method implemented in a wireless device (WD), the method comprising one or more of:
receiving a message, the message being a radio resource control (RRC) reconfiguration message that includes a conditional handover (CHO) configuration and an indication of a handover (HO) command, the CHO prepared by a target network node and the HO command prepared by a source network node;
responsive to the received message, attempting to access the target network node indicated in the HO command; and/or
as a result of accessing the target network node, performing the CHO according to the CHO configuration in the received message.

Embodiment D2. The method of Embodiment D1, further comprising:
responsive to a HO failure while attempting to access the target network node, selecting a candidate cell indicated in the CHO configuration and perform a handover of the WD to the selected candidate cell.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

It will be appreciated by persons skilled in the art that the embodiments described herein are not limited to what has been particularly shown and described herein above. In addition, unless mention was made above to the contrary, it may be noted that all of the accompanying drawings are not to scale. A variety of modifications and variations are possible in light of the above teachings without departing from the scope of the following claims.

What is claimed is:

1. A method implemented in a wireless device (WD), configured to communicate with a source network node and a target network node, the method comprising:
    receiving at least one radio resource control (RRC) reconfiguration message, the at least one RRC reconfiguration message including a conditional reconfiguration prepared by the target network node and an indication that the WD is to perform a mobility procedure from a source cell supported by the source network node to a target cell supported by the target network node;
    attempting to access the target cell according to the indicated mobility procedure;
    when the attempt to access the target cell succeeds, then performing a cell change according to the indicated mobility procedure; and
    when an attempt to access the target cell fails, performing a cell change to a target candidate cell selected associated with the conditional reconfiguration from one of a first set of candidate cells associated with the source network node supporting the source cell.

2. The method of claim 1, wherein
    each selected candidate cell is associated with a respective conditional reconfiguration and the target network node.

3. The method of claim 1, wherein
    each selected candidate cell being associated with a respective conditional reconfiguration and the source network node supporting the source cell.

4. The method of claim 1, wherein the conditional reconfiguration and the indication to perform the mobility procedure are both included in a same RRC reconfiguration message.

5. The method of claim 4, wherein an explicit indication indicates to the WD to perform the conditional reconfiguration comprised in the same RRC reconfiguration message only after accessing the target cell according to the mobility procedure indicated in the same RRC reconfiguration message.

6. The method of claim 1, wherein the conditional reconfiguration and the indication to perform the mobility procedure are prohibited from being in a same RRC reconfiguration message.

7. The method of claim 1, further comprising:
when the conditional reconfiguration and the indication to perform the mobility procedure are included in a same RRC reconfiguration message, performing an RRC re-establishment procedure, instead of the indicated mobility procedure and the conditional reconfiguration.

8. The method of claim 1, wherein the mobility procedure is a handover of the WD from the source cell to the target cell.

9. The method of claim 1, wherein the mobility procedure corresponds to request to at least one of add and change a primary secondary cell, PScell, for the WD.

10. The method of claim 1, wherein the indication to perform the mobility procedure includes one of a reconfiguration with sync field and a mobility control information field comprised in the at least one RRC reconfiguration message.

11. The method of claim 1, further comprising receiving signaling indicating to one of add, modify and release the conditional reconfiguration of the target candidate cell prepared by the target network node.

12. The method of claim 1, wherein the conditional reconfiguration associated with the target candidate cell includes a trigger condition configuration, the trigger condition configuration including a set of pointers to at least one measurement identifier, and each measurement identifier of the at least one measurement identifier is associated with at least one trigger condition and an RRC reconfiguration.

13. The method of claim 1, further comprising:
determining to not transmit a RRC reconfiguration complete message based at least in part on a presence of the conditional reconfiguration associated with the target candidate cell in the at least one RRC reconfiguration message.

14. A method implemented in a target network node, the method comprising:
receiving a request to perform a mobility procedure for a wireless device (WD) from a source cell supported by a source network node to a target cell supported by the target network node, the request including a current configuration for the WD in the source cell;
upon receiving the request, determining to prepare a conditional reconfiguration for the WD; and
transmitting the conditional reconfiguration and a radio resource control (RRC) reconfiguration for the WD, the RRC reconfiguration being associated with the requested mobility procedure from the source cell supported by the source network node to the target cell supported by the target network node;
when an attempt to access the target cell succeeds, performing a cell change according to the requested mobility procedure; and
when the attempt to access the target cell fails, transmitting an explicit indication to select the target candidate cell associated with the conditional reconfiguration from one of a first set of candidate cells associated with the source network node supporting the source cell.

15. A wireless device (WD) configured to communicate with a source network node and a target network node, the WD comprising processing circuitry, the processing circuitry configured to cause the WD to:
receive at least one radio resource control (RRC) reconfiguration message, the at least one RRC reconfiguration message including a conditional reconfiguration prepared by the target network node and an indication that the WD is to perform a mobility procedure from a source cell supported by the source network node to a target cell supported by the target network node;
attempting to access the target cell according to the indicated mobility procedure;
when the attempt to access the target cell succeeds, then performing a cell change according to the indicated mobility procedure; and
when an attempt to access the target cell fails, performing a cell change to a target candidate cell selected associated with the conditional reconfiguration from one of a first set of candidate cells associated with the source network node supporting the source cell.

16. A target network node, the target network node comprising processing circuitry, the processing circuitry configured to cause the target network node to:
receive a request to perform a mobility procedure for a wireless device (WD) from a source cell supported by a source network node to a target cell supported by the target network node, the request including a current configuration for the WD in the source cell;
upon receiving the request, determine to prepare a conditional reconfiguration for the WD; and
transmit the conditional reconfiguration and a radio resource control (RRC) reconfiguration for the WD, the RRC reconfiguration being associated with the requested mobility procedure from the source cell supported by the source network node to the target cell supported by the target network node;
when an attempt to access the target cell succeeds, perform a cell change according to the requested mobility procedure; and
when the attempt to access the target cell fails, transmit an explicit indication to select the target candidate cell associated with the conditional reconfiguration from one of a first set of candidate cells associated with the source network node supporting the source cell.

* * * * *